(12) United States Patent
Kuroshima

(10) Patent No.: US 7,761,433 B2
(45) Date of Patent: Jul. 20, 2010

(54) DOCUMENT PROCESSING APPARATUS, METHOD AND PROGRAM

(75) Inventor: Masashi Kuroshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 11/146,070

(22) Filed: Jun. 7, 2005

(65) Prior Publication Data

US 2005/0289462 A1     Dec. 29, 2005

(30) Foreign Application Priority Data

Jun. 15, 2004     (JP)     ............................. 2004-177339

(51) Int. Cl.
  G06F 7/00     (2006.01)
  G06F 7/04     (2006.01)
(52) U.S. Cl. ........................... 707/694; 726/27
(58) Field of Classification Search ................. 707/200, 707/694
See application file for complete search history.

(56) References Cited

U.S. PATENT DOCUMENTS

| | | | | |
|---|---|---|---|---|
| 5,572,727 | A * | 11/1996 | Larsson et al. | 707/200 |
| 6,339,767 | B1 * | 1/2002 | Rivette et al. | 707/2 |
| 6,403,871 | B2 * | 6/2002 | Shimizu et al. | 84/622 |
| 2001/0016859 | A1 * | 8/2001 | Sekido et al. | 707/530 |
| 2001/0032217 | A1 * | 10/2001 | Huang | 707/513 |
| 2001/0037722 | A1 * | 11/2001 | Shimizu et al. | 84/622 |
| 2002/0129056 | A1 * | 9/2002 | Conant et al. | 707/511 |
| 2003/0184806 | A1 | 10/2003 | Nara et al. | |
| 2004/0054893 | A1 * | 3/2004 | Ellis | 713/165 |
| 2004/0090644 | A1 * | 5/2004 | Nishikawa | 358/1.13 |
| 2004/0107855 | A1 * | 6/2004 | Kizaki et al. | 101/484 |
| 2004/0111675 | A1 * | 6/2004 | Mori et al. | 715/513 |
| 2005/0038881 | A1 * | 2/2005 | Ben-Itzhak | 709/223 |
| 2005/0063027 | A1 * | 3/2005 | Durst et al. | 359/2 |
| 2005/0131830 | A1 * | 6/2005 | Juarez et al. | 705/51 |
| 2005/0132070 | A1 * | 6/2005 | Redlich et al. | 709/228 |
| 2005/0246387 | A1 * | 11/2005 | McChrystal | 707/200 |

(Continued)

FOREIGN PATENT DOCUMENTS

JP     5-143430     6/1993

(Continued)

OTHER PUBLICATIONS

Craig Stinson, "Windows NT Workstation Version 4.0 Official Manual", ASCII Corporation, Dec. 21, 1997, vol. 1, pp. 31, 533-535 (with partial translation).

(Continued)

*Primary Examiner*—Neveen Abel Jalil
*Assistant Examiner*—Tarek Chbouki
(74) *Attorney, Agent, or Firm*—Fitzpatrick, Cella, Harper & Scinto

(57) ABSTRACT

In order to import a document file in which security information is set into a document file to be edited with the security information being included in the document file, a document processing apparatus which imports a specified first document file in which security information is set into a second document file includes an import controller that causes the first document file to be held in the second document file with security information being contained in the first document file to generate a third document file, if the security information is added to the first document file.

13 Claims, 27 Drawing Sheets

U.S. PATENT DOCUMENTS

2009/0217372 A1* 8/2009 Yeung et al. .................. 726/17

FOREIGN PATENT DOCUMENTS

| JP | 5-233411 | 9/1993 |
| JP | 6-214862 | 8/1994 |
| JP | 8-161214 | 6/1996 |
| JP | 2000-215095 | 8/2000 |
| JP | 2001-084246 | 3/2001 |
| JP | 2001-175648 | 6/2001 |
| JP | 2003-162404 | 6/2003 |
| JP | 2004-151868 | 5/2004 |

OTHER PUBLICATIONS

JDF Specification Spiral 6.0 Candidate for Release Version 1.0, CIP4 Organization, Feb. 2001, Appendix K, p. 443.

JDF Specification Release 1.0, CIP4 Organization, Apr. 2001, Appendix K, p. 450.

CIP4 Message Archive, [online], [retrieved on Jun. 29, 2005]. Retrieved from the Internet: <url:http://www.cip4.org/news/news_archive.html>.

* cited by examiner

FIG. 5

[ELECTRONIC DOCUMENT FILE HEADER INFORMATION] 40

| | | |
|---|---|---|
| | TOTAL FILE NUMBER | 50 |
| | SIZE OF ELECTRONIC DOCUMENT FILE | 51 |
| | OFFSET TO FIRST FILE INFORMATION AREA | 52 |
| FILE 1 | FILE NAME | 53 |
| | FILE SIZE | 54 |
| | OFFSET TO FILE BODY | 55 |
| | COMPRESSION FLAG | 56 |
| | COMPRESSION METHOD | 57 |
| | FILE ATTRIBUTE | 58 |
| | OFFSET TO NEXT FILE INFORMATION AREA | 59 |
| | ⋮ | |
| FILE N | FILENAME | |
| | FILE SIZE | |
| | OFFSET TO FILE BODY | |
| | COMPRESSION FLAG | |
| | COMPRESSION METHOD | |
| | FILE ATTRIBUTE | |
| | OFFSET TO NEXT FILE INFORMATION AREA | |

[PRINT PROCEDURE DESCRIPTION FILE]

```xml
<?xmlversion='1.0'encoding='utf-8'?>
<JDF ID=" HDM200011011026111" Type=" ColorSpaceCoversion" JobID=" HDM200011011026111"
Status=" waiting" version=" 1.0" >
< ! —(c)Heidelberger Druckmaschinen Ag 1999-2000—>
< ! —Warning:preliminary format;use at your own risk—>
<NodeInfo/>
<ResourcePool>
<RunListID=" Link0003" Class=" Parameter" Status= "Available" Pages=" 0 -1" >
<LayoutElement>
<FileSpecURL= "file::/in/colortest,pdf" />
</LayoutElement>
</RunList>
<ColorSpaceConversionPraramsID=" Link0004" Class=" Parameter" Status=" Available"
FinalTargetDevice=" File::SMProcessCMYK.icc" >
<ColorSpaceConversionOp SourceCS=" RGB" Operation=" Convert" SourceObjects=" ImagePhotographic
ImageScreenShotSmoothShades" SourceProfile= "File::image.icc" RenderingIntent=" Perceptual" />
<ColorSpaceConversionOp SourceCS=" RGB" Operation=" Convert" SourceObjects=" Text LineArt"
SourceProfile=" File::text.icc" RenderingIntent= "Perceptual" />
</ColorSpaceConversionParams>
<ColorLPoolID=" Link0005" Class=" Parameter"  Status=" Available" >
<Color CMYK=" 1000" Name=" Cyan" />
<Color CMYK=" 0100" Name=" Magenta" />
<Color CMYK=" 0010" Name=" Yellow" />
<Color CMYK=" 0001" Name=" Black" />
<Color CMYK=" 0.80.800" Name=" Blue" />
</ColorPool>
<ColorantControlID=" Link0006" Class=" Parameter" rRefs=" Link0005" Status=" Available"
ProcessColorModel=" DeviceCMYK" >
<ColorPoolRefrRef= "Link0005" />
</ColorantControl>
<RunListID=" Link0007" Class=" Parameter" Status= "Unavailable" Pages=" 0 -1" >
<LayoutElement>
<FileSpecURL= "file::/out/colortest,pdf" />
</LayoutElement>
</RunList>
</ResourcePool>
<ResourceLinkPool>
<RunListLinkrRef=" Link0003" Usage= "Input" />
<ColorSpaceConversionParamslLinkrRef=" Link0004" Usage= "Input" />
<ColorPoolLinkrRef=" Link0005" Usage= "Input" />
<ColorantControlLinkrRef=" Link0006" Usage= "Input" />
<RunListLinkrRef=" Link0007" Usage= "Output" />
</ResourceLinkPool>
<AuditPool>
<Created Author=" Rainer's JDFWriter0.2000" TimeStamp=" 2000-11-01T10:26:11+01:00" />
</AuditPool>
</JDF>
```

FIG. 17A

| CHAPTER | ELECTRONIC DOCUMENT FILE PAGE NUMBER | FILE NUMBER | NUMBER OF PAGES OF FILE | SECURITY INFORMATION | | | |
|---|---|---|---|---|---|---|---|
| 1 | 1 | 1 | 1 | 0 | 0 | 0 | 0 |
|   | 2 | 1 | 2 | 0 | 0 | 0 | 0 |
|   | 3 | 1 | 3 | 0 | 0 | 0 | 0 |
|   | 4 | PRINT FILE 2 | 1 | 1 | 0 | 0 | 0 |
| 2 | 5 | PRINT FILE 2 | 2 | 1 | 0 | 0 | 0 |
|   | 6 | PRINT FILE 2 | 3 | 1 | 0 | 0 | 0 |
|   | 7 | 1 | 4 | 0 | 0 | 0 | 0 |
| 3 | 8 | 1 | 5 | 0 | 0 | 0 | 0 |
|   | 9 | 1 | 6 | 0 | 0 | 0 | 0 |

FIG. 17B

| CHAPTER | ELECTRONIC DOCUMENT FILE PAGE NUMBER | FILE NUMBER | SECURITY INFORMATION | | | | NUMBER OF PAGES OF FILE |
|---|---|---|---|---|---|---|---|
| 1 | 1 | 1 | 0 | 0 | 0 | 0 | 1 |
|   | 2 | 1 | | | | | 2 |
|   | 3 | 1 | | | | | 3 |
|   | 4 | PRINT FILE 2 | 1 | 0 | 0 | 0 | 1 |
| 2 | 5 | PRINT FILE 2 | | | | | 2 |
|   | 6 | PRINT FILE 2 | | | | | 3 |
|   | 7 | 1 | 0 | 0 | 0 | 0 | 4 |
| 3 | 8 | 1 | | | | | 5 |
|   | 9 | 1 | | | | | 6 |

[ELECTRONIC DOCUMENT FILE HEADER INFORMATION]

| | | |
|---|---|---|
| NUMBER OF FILES | | 50 |
| ELECTRONIC DOCUMENT FILE SIZE | | 51 |
| OFFSET TO FIST FILE INFORMATION AREA | | 52 |
| SECURITY INFORMATION | | 230 |
| FILE 1 | FILE NAME | 53 |
| | FILE SIZE | 54 |
| | OFFSET TO FILE BODY | 55 |
| | COMPRESSION FLAG | 56 |
| | COMPRESSION METHOD | 57 |
| | FILE ATTRIBUTE | 58 |
| | OFFSET TO NEXT FILE INFORMATION AREA | 59 |
| ⋮ | ⋮ | |
| FILE N | FILE NAME | |
| | FILE SIZE | |
| | OFFSET TO FILE BODY | |
| | COMPRESSION FLAG | |
| | COMPRESSION METHOD | |
| | FILE ATTRIBUTE | |
| | OFFSET TO NEXT FILE INFORMATION AREA | |

DOCUMENT PROCESSING APPARATUS, METHOD AND PROGRAM

FIELD OF THE INVENTION

The present invention relates to a document processing apparatus, a document processing method, and a document processing program for providing an edit function that imports a document file in which security information is set into a document file to be edited together with the security information settings included in the document file in a system including an information processing device, such as a personal computer, and a printer.

BACKGROUND OF THE INVENTION

Conventional electronic document processing systems simply prevent an electronic document file to which such security information that prohibits edit, print, or copy of the document is attached from being imported into another electronic document file being edited, according to the security information. Also, a mechanism is known that circumvents security by invalidating security information attached to an electronic document file when one tries to import the electronic document into an electronic document file to be edited.

There are techniques that differentiate between printable and unprintable pages in an electronic document, such as the one disclosed in Japanese Patent Application Laid-Open No. 2003-162404.

The conventional electronic document processing systems have a problem that, because they prevent an electronic document file in which security information for preventing edit, print, or copy is set from being imported into another electronic document file on the basis of the security information, those files must be maintained separately for editing and thus their usability is degraded.

Another mechanism is known that circumvents security by invalidating security information attached to an electronic document file imported into another electronic document file to be edited.

SUMMARY OF THE INVENTION

In light of the background of the art, an object of the present invention is to provide an electronic document processing technique that enables an electronic document file for which security information is set to be imported into an electronic document file to be edited.

To achieve the object, a document processing apparatus, method, and program have the following main configurations.

More specifically, a document processing apparatus for importing a specified first document file into a second document file to be edited, comprises: an import controller that causes the first document file to be held in the second document file with security information being contained in the first document file to generate a third document file, if the security information is added to the first document file.

Moreover, a document processing method for importing a first specified document file into a second document file to be edited, comprises: an import control step of causing the first document file to be held in the second document file with security information being contained in the first document file to generate a third document file, if security information is added to the first document file.

Moreover, a document processing program which causes a computer to perform a document processing method for importing a specified first document file into a second document file to be edited, comprises: a program code for an import control step of causing the first document file to be held in the second document file with security information being contained in the first document file to generate a third document file, if security information is added to the first document file.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an exemplary configuration of the header information of the electronic document file illustrated in FIG. 4;

FIG. 7 shows a specific example of a printing procedure description file;

FIGS. 17A and 17B are diagrams for outlining configurations of management tables;

FIG. 23 shows a configuration of file header information of an electronic document in which security information generated by a CPU is recorded;

DETAILED DESCRIPTION OF THE PREFERRED EMBODIMENTS

Embodiments of the present invention will be described below with reference to the accompanying drawings.

(Hardware Configuration)

Figure 1:
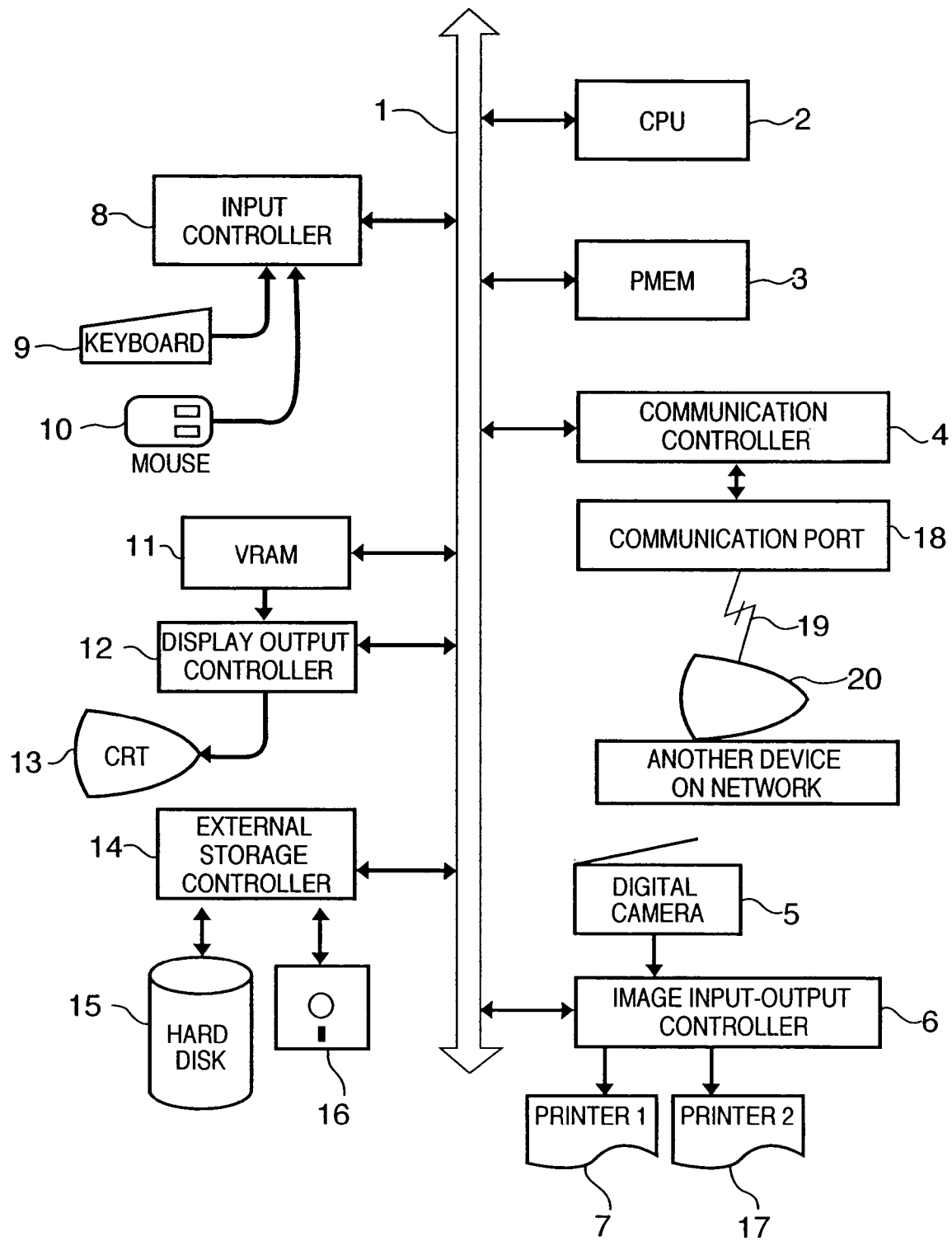
FIG. 1 is a block diagram of an electronic document processing apparatus according to an embodiment of the present invention.

FIG. 1 is a block diagram of an electronic document processing apparatus according to an embodiment of the present invention which has a block configuration similar to that of commonly known information processing apparatuses. Reference numeral 1 denotes a system bus onto which components which will be described below are connected. Reference numeral 2 denotes a central processing unit (CPU). Reference numeral 3 denotes a program memory (hereinafter referred to as the "PMEM") storing programs for performing various processes such as data edit, control of reading devices, analysis of print procedure description files, and print processing based on the analysis. The CPU 2 selects, reads, and executes a program from among these programs as appropriate. Data generated and data for print processing are stored in the PMEM, which serves as a data storage memory. The PMEM is also used for temporarily storing text data and instructions inputted by a user through a keyboard 9.

Reference numeral 4 denotes a communication controller which controls input and output data at a communication port 18. Signals outputted through the communication port 18 are provided to a communication port of another device on the network through a communication line 19. Reference numeral 20 denotes another electronic document processing apparatus connected through the communication line 19. Electronic document files are sent and received to and from a printer shared on the network or other electronic document processing apparatuses on the network through the communication controller 4.

While the present embodiment is described with respect to a network such as a LAN, the spirit of the present invention is not so limited. The present invention can be applied to a case where other communication means, such as a public network, is used as a communication port or communication line connected to the communication controller.

Reference numeral 5 denotes a digital camera and 6 denotes an image input/output controller. Reference numerals 7 and 17 denote printers. Image data read from the digital camera 5 is loaded in the PMEM 3 through the image input/output controller 6, then loaded in a VRAM 11 and displayed on a display 13 through a display output controller 12. Image data read from the digital camera 5 may be outputted to the printers 7 and 17 through the image input/output controller 6.

Reference numeral 8 denotes an input controller to which input devices such as a keyboard 9 and a pointing device (hereinafter also referred to as the "PD") such as a mouse 10 are connected. An operator can operate the keyboard 9 to provide instructions to the system. The keyboard 9 and the PD 10 can be used to select image information, text data, or numerical data contained in an electronic document file displayed on the display 13 and specify edit operations or to perform operations for setting print parameters. A mouse cursor on the display 13 can be moved in the X and Y directions as appropriate to select and edit a menu option, image data, graphic data, text data, numerical data, or a print parameter.

Reference numeral 11 denotes a video image memory (hereinafter referred to as the "VRAM") and 12 denotes a display output controller. Data to be displayed on the DISPLAY 13 is loaded on the VRAM 11 as bitmap data. For example, graphic data is loaded a graphic pattern is loaded according to information about its position and rendering attributes.

Reference numerals 15 and 16 denote disks for data files for recording image data, graphic data, text data, or numerical data. For example, the disk 15 may be a hard disk (hereinafter referred to as the "HD") and the disk 16 may be a flexible disk (hereinafter referred to the "FD"). An external storage controller 14 controls store and read of data to and fro the HD 15 and the FD 16.

In the present embodiment, the HD 15 stores programs providing functions such as an archive function for integrating a number of files into one file and a function for printing electronic document files. These programs may be stored in recording media such as a ROM, a flexible disk 16, a CD-ROM, a memory card, or a magneto-optical disk.

Figure 2:
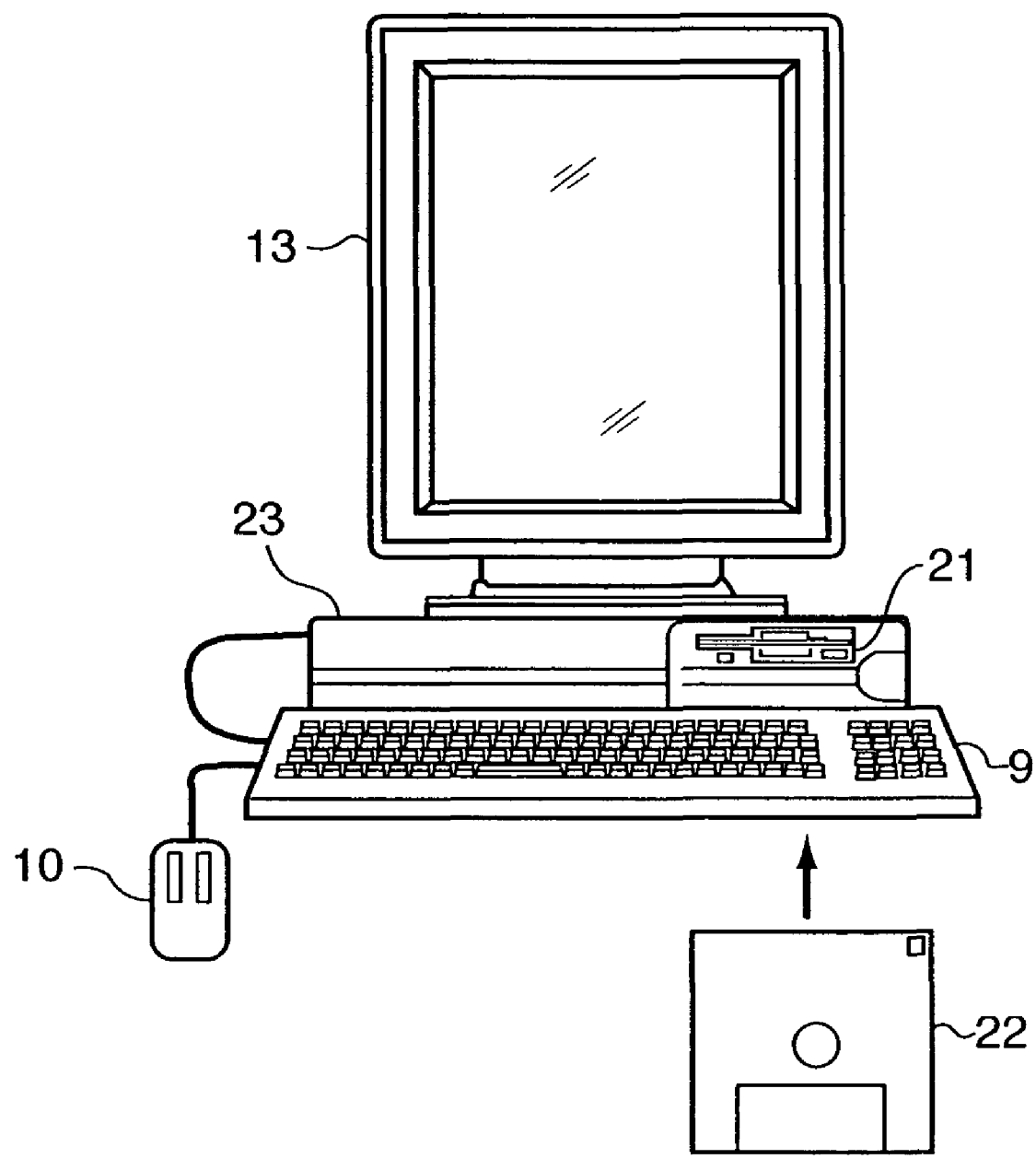
FIG. 2 shows an external view of the electronic document processing apparatus according to the embodiment of the present invention.

FIG. 2 shows an external view of an electronic document processing apparatus according to an embodiment of the present invention. In FIG. 2, reference numeral 23 indicates the system unit of the electronic document processing apparatus containing a system bus 1, a CPU 2, a PMEM3, and a communication controller 4. Reference numeral 13 denotes a display, 9 denotes a keyboard, 10 denotes a PD, and 21 denotes an FD drive in which an FD 22 is placed and an electronic document file, image data, graphic data, text data, or numerical data can be written onto the FD 22 or such data recorded on the FD 22 can be read into the electronic document processing apparatus.

The present invention can be implemented in an electronic document processing apparatus in which programs are recorded on an HD 15 and, in addition, the present invention can be implemented in other system or electronic document processing apparatus by providing a recording medium on which a program that implements the present invention is recorded to that system or apparatus and reading and executing program codes stored on the recording medium by a system of that system or apparatus.

For example, the present invention can be implemented by other electronic document processing apparatus by placing an FD 22 on which a program having functions such as a archive function for integrating multiple files into one file and a function for printing electronic document files in an FD drive 21 of the electronic document processing apparatus, loading the program onto a hard disk 15, and executing the loaded program.

(Exemplary Configuration of Electronic Document File)

Figure 3:
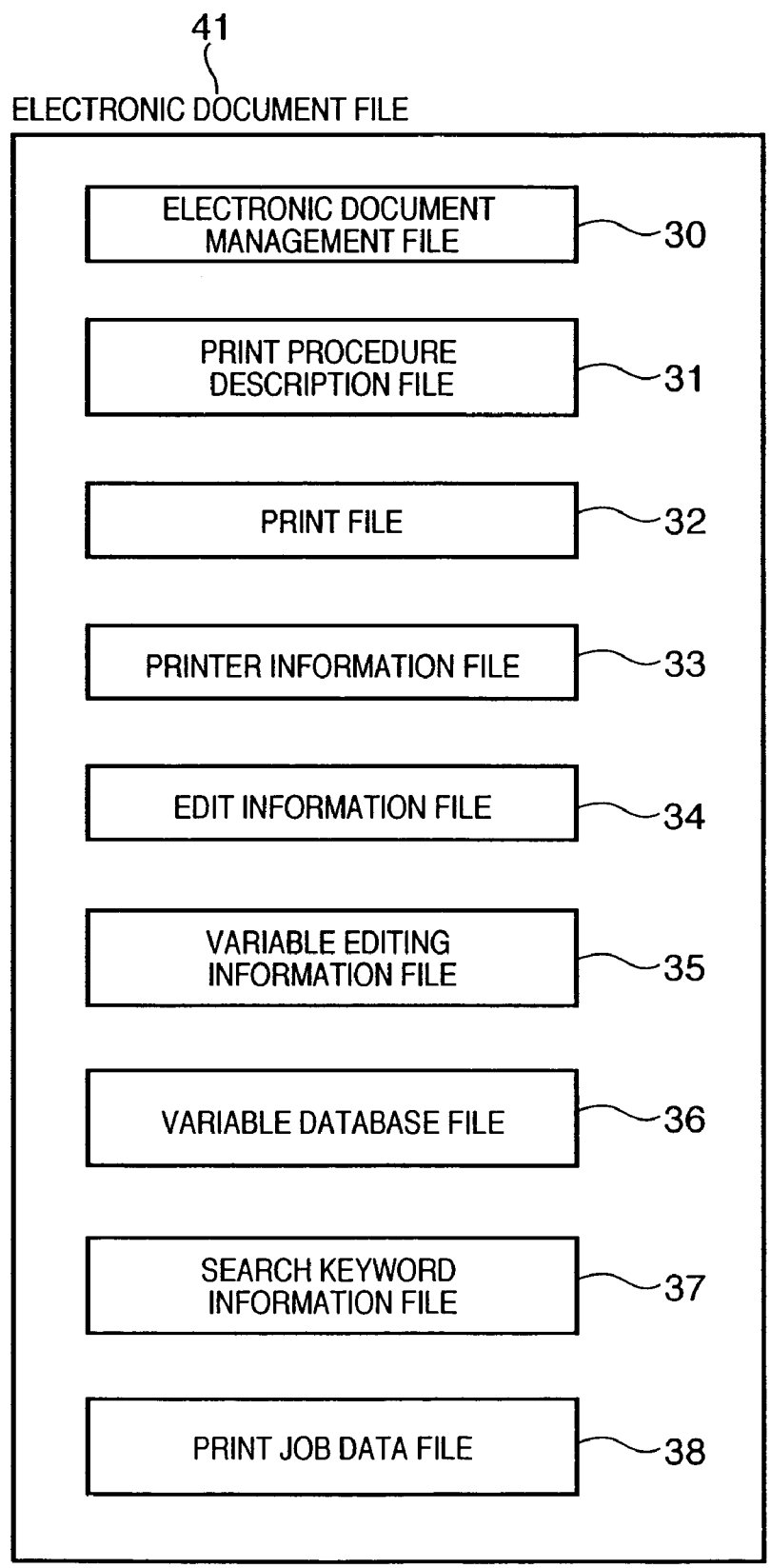
FIG. 3 shows a list of files constituting to a typical electronic document file.

FIG. 3 shows a configuration of a typical electronic document file. A list of files included in the electronic document file is shown in FIG. 3. Reference numeral 30 denotes an electronic document management file containing information for managing what kinds of files are contained in the electronic document file. Reference numeral 31 denotes a printing procedure description file containing all instructions concerning printing of the electronic document file, including instructions as to where on a sheet pages X to Y should be printed, whether or not those pages should be scaled or rotated, what kind of layout should be used, how many copies of those pages should be printed, or whether the printed sheets are to be stapled. Reference numeral 32 denotes a print file, which is an image file itself to be printed according to instructions stored in the printing procedure recording file. The image file may be the commonly known BMP format, TIFF format, or PDF format (PDF is a registered trademark of Adobe Systems Incorporated) or any other image format. The present invention can be implemented with any image file format.

While the PDF file format is used as an example in the following description of a specific importing process shown in FIG. 21, the spirit of the present invention is not limited to that file format. It will be understood that the present invention can be applied to any file format that allows security information to be added to an electronic document file. While only one print file is shown in FIG. 3, a print file set may be formed by a number of print files.

Reference numeral 33 denotes a printer information file containing information specific to individual printers, which may be DEVMODE structure information in Windows®, for example. By recording DEVMODE information which was set in a printer driver during the previous printing of the electronic document file, the same information set in the printer driver can be set when the file is reprinted. Reference numeral 34 denotes edit information containing information required for editing the electronic document file, such as the scaling factor with which the electronic document file was displayed the number of page that was displayed during the previous editing. Editing of electronic document files does not pertain to the present invention and therefore detailed description of which is omitted.

Reference numeral 35 denotes a variable editing information file containing information for performing variable printing of the electronic document file ("variable printing" is printing that allows a portion of a document, such as a customer-name portion, to be changed on a copy-by-copy basis when multiple copies of the document are printed). Contained in the variable information file is such information that indicates which page of the electronic document file should be changed and in what manner. Variable printing does not pertain to the present invention and therefore detailed description of which is omitted.

Reference numeral 36 denotes a variable database file, which is print data used for variable printing. Print data to be changed on a copy-by-copy basis may be text, image or any other data. Reference numeral 37 denotes a search keyword information file containing information indicating what kind of keyword should be registered in a database when the electronic document file is stored in the database for searching for the document. Reference numeral 38 denotes a print job data file which is a job file for printing generated by a printer driver when the electronic document file was printed and which is to be used when next time the electronic document file is printed on the same printer. The electronic document file may be stored in any database. Storing electronic document files in a database does not pertain to the present invention and therefore the description of which is omitted.

Figure 4:
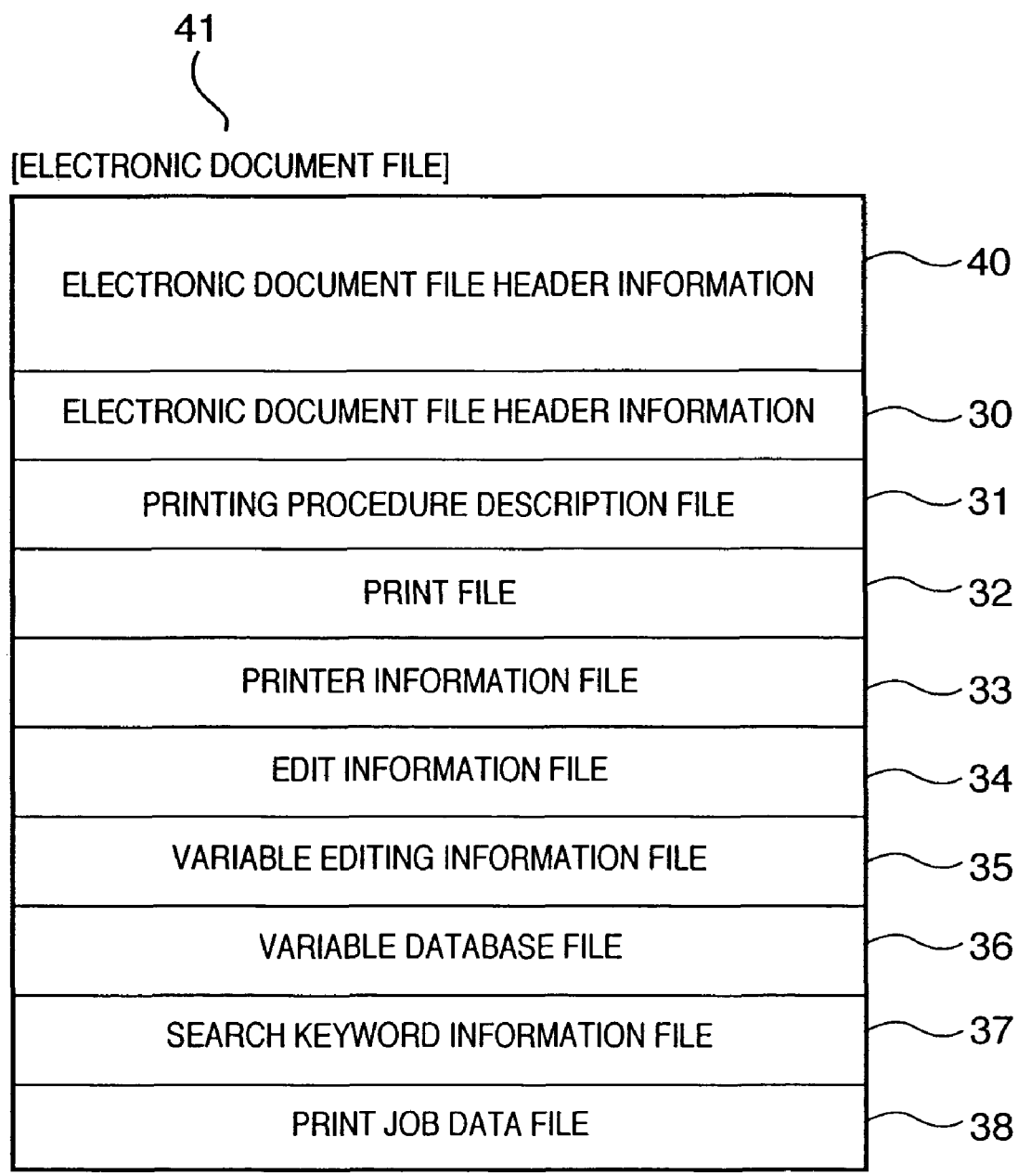
FIG. 4 shows an exemplary configuration of an electronic document file in which various files are merged and which is archived.

FIG. 4 shows an exemplary configuration of an electronic document file into which files are integrated and archived. Reference numeral 41 denotes an archive electronic document file in which an electronic document file header information and various other files are merged. Reference numeral 40 denotes the header information of the electronic document file which contains information for managing the archive electronic document file. The electronic document file header information can be used to restore the merged archive electronic document file to the previous state. Reference numerals 30 to 38 denotes the files that constitute the electronic document file (FIG. 3)

FIG. 5 shows in detail an exemplary configuration of the electronic document file header information 40 illustrated in FIG. 4. Reference numeral 50 denotes the total number of the files contained in the electronic document file. The total number of files is determined from the number of the files shown in FIGS. 3 and 4. From the number of the files, one can know the number of files about which information is contained in the electronic document file header information 40. Reference numeral 51 denotes an electronic document file size filed indicating the size of the archive electronic document file. Reference numeral 52 denotes a filed containing an offset from the starting position of the file to the first file information area which indicates the area in the archive electronic document file in which the data area indicated by reference numeral 53 exists. Reference numerals 53 to 59 denote information about each file stored in the archive electronic document file. If the archive electronic document file contains N files, file information 53 to 50 concerning N files is stored.

Reference numeral 53 denotes the file name, which is assigned to each file when it is retrieved from the archive electronic document file. Reference numeral 54 denotes the file size, which indicates the size of the area in the archive electronic document file that is occupied by the file. In particular, the size varies depending on whether the file is compressed or not. Reference numeral 55 denotes the offset to the body of the file which is the offset of the area in the archive electronic document file occupied by the file from the starting point of the file. Reference numeral 56 denotes a compression flag, which indicates whether the file stored in the archive electronic document file is compressed or not. Reference numeral 57 denotes a compression method, such as MMR, which serves only when the compression flag 56 indicates that the file is compressed.

The description of details of compression methods is omitted. Reference numeral 58 denotes a file attribute. This field contains a file attribute such as Read Only which originally belongs to the file and will be given to the file when it is unarchived by an unarchiving function. Reference numeral 59 denotes the offset to the next file information area, which is the offset from the starting point of the archive electronic document file. While information about the remaining files is omitted from FIG. 5, items 53 to 59 for the files are recorded in the same pattern.

Figure 6:
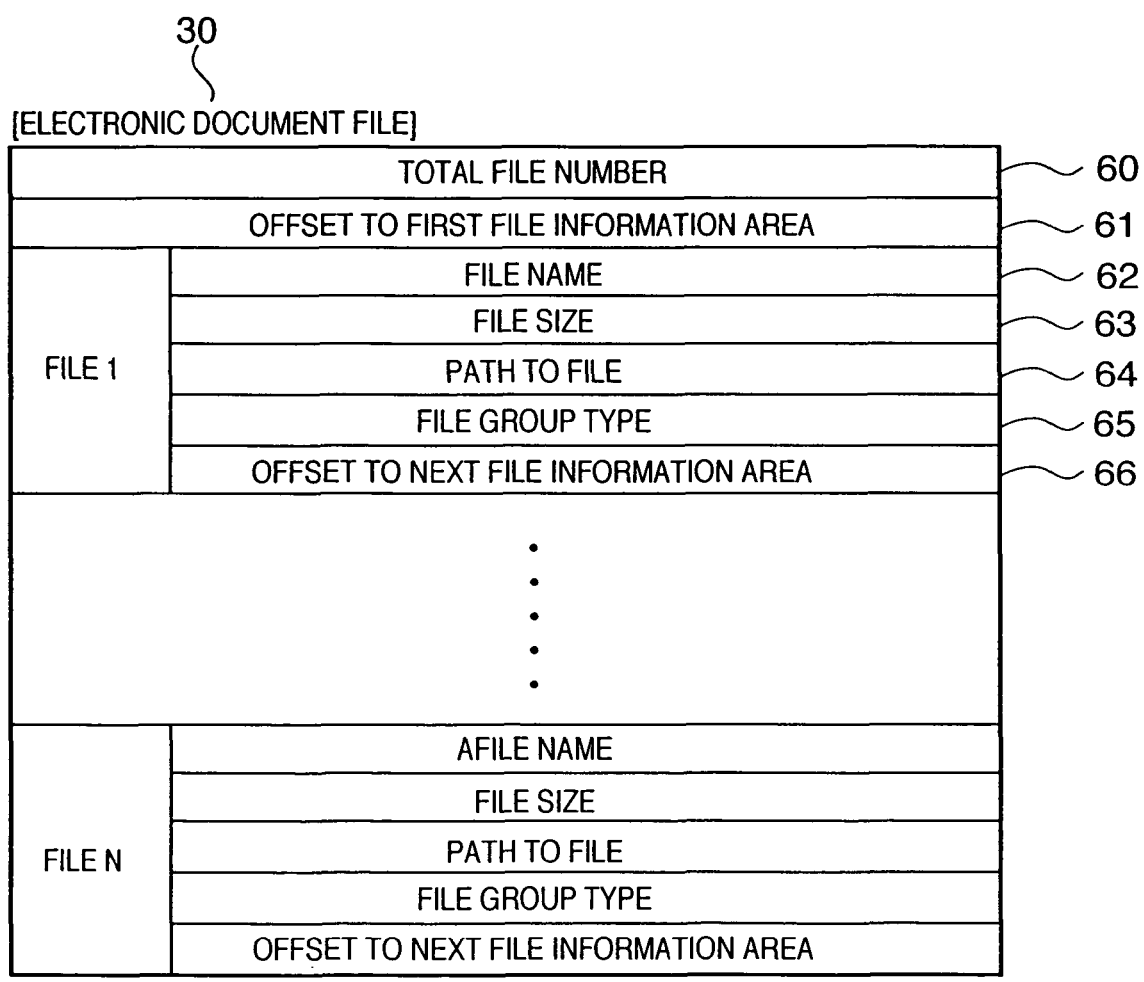
FIG. 6 shows an exemplary configuration of an electronic document management file illustrated in FIG. 3.

FIG. 6 shows an exemplary configuration of an electronic document management file 30 mentioned with reference to FIG. 3. The electronic document management file contains information for managing the individual files constituting an archive electronic document file when the archive electronic document file is restored to the individual files by an unarchiving function.

Reference numeral 60 denotes a total file number filed which indicates the number of the files constituting the electronic document file. The print procedure file 31 through the print job data file 38 shown in FIG. 3 are the constituent files and therefore the number of files is 8 in this example. Reference numeral 61 denotes the offset to the first file information area in which the first file information is recorded from the starting point of the electronic document management file. Recorded in the fields 62 to 66 is information about each of the files constituting the electronic document file. Filed 62 is a file name field which indicates the name of each of the files constituting the electronic document file. This may be the name of a file such as the print procedure description file 31, for example. Field 63 is a file size field in which the size of the print procedure description file 31, for example, is recorded. Field 64 contains a path to the file, which indicates the directory in which the file is created. Filed 65 is a file group type field in which the type of a file such as the print procedure description file 31 through the print job data file 38 can be recorded. If there are multiple print procedure description files 31, for example, this filed the files to be of the same time. Filed 66 contains the offset to the next file information area which indicates the offset from the starting point of the electronic document management file. While information about the remaining files are omitted from FIG. 6, items 62 to 66 for the remaining N files are recorded in the same pattern.

FIG. 7 shows a specific example of the print procedure description file 31. As described earlier, the print procedure description file 31 describes a process and procedure indicating how an electronic document file should be printed. Examples of known methods for describing a print procedure include JDF (which is a registered trade mark of the CIP4 Organization). FIG. 7 shows an example of description in JDF, which is extracted from "the JDF Specification Spiral 6.0 Candidate for Release Version 1.0". Descriptions in a format such as JDF allow one to select multiple printers to use for printing and describe how data should be printed on each of the printers. It is assumed here that the print procedure description file 31 includes a function for analyzing a file described in JDF.

Figure 8:
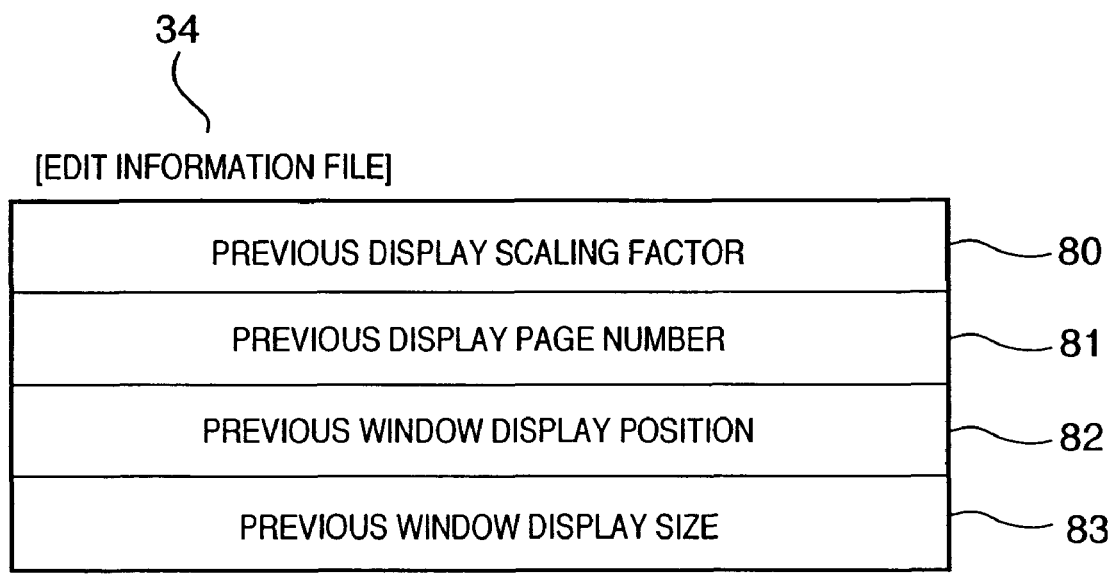
FIG. 8 shows an exemplary configuration of an edit information file.

FIG. 8 shows an exemplary configuration of an edit information file 34. The edit information file 34 is an area in which information required for creating and editing an electronic document file. It is assumed here that the following information is recorded.

Reference numeral 80 denotes the previous display scaling factor which is the scaling factor with which the electronic document file was previously displayed. Reference numeral 81 denotes the previous display page number which indicates the number of page of the electronic document file that was displayed. Reference numeral 82 denotes the previous window display position which indicates the position in which a window for editing the electronic document file was displayed. Reference numeral 83 denotes the window display size which indicates the size of a window for editing the electronic document file.

Figure 9:
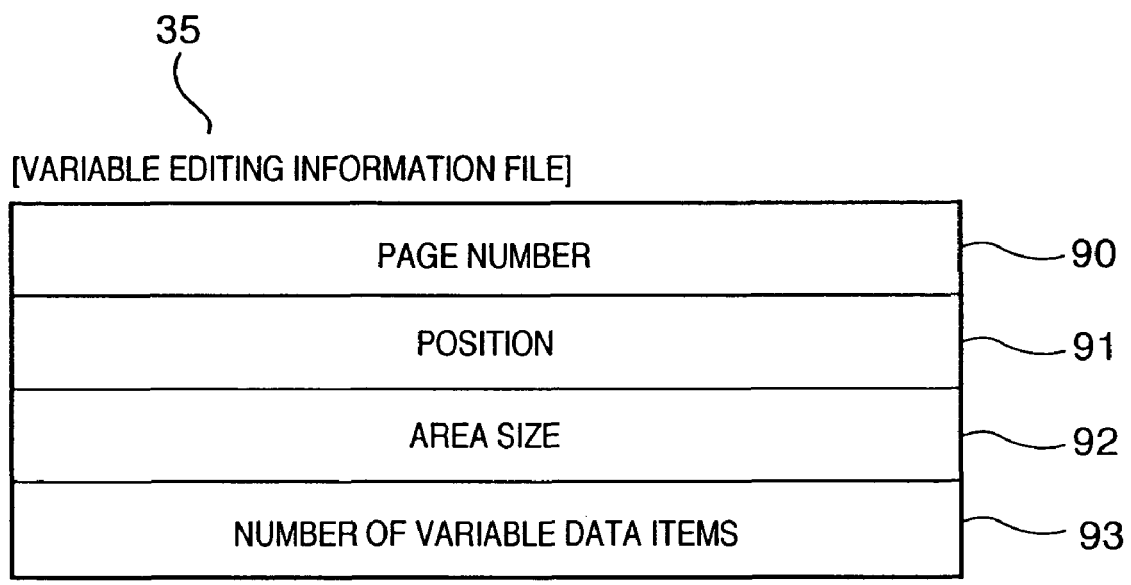
FIG. 9 shows an exemplary configuration of a variable editing information file.

FIG. 9 shows an exemplary configuration of a variable editing information file 35. Reference numeral 90 denotes a page number which indicates the number of a page of the electronic document file that contains an area to be variably printed during printing. Reference numeral 91 denotes a position value which indicates where in the page indicated by the page number 90 contains an area to be variably printed. Reference numeral 92 denotes an area size which indicates the size of a rectangular area with its origin, which is the upper left corner of the area, at the position indicated by the position value 91. Reference numeral 93 denotes the number of variable data items recorded in a variable database file 36. More than one field to be variably printed can be recorded in the variable editing information file 35 of one electronic document file.

Figure 10:
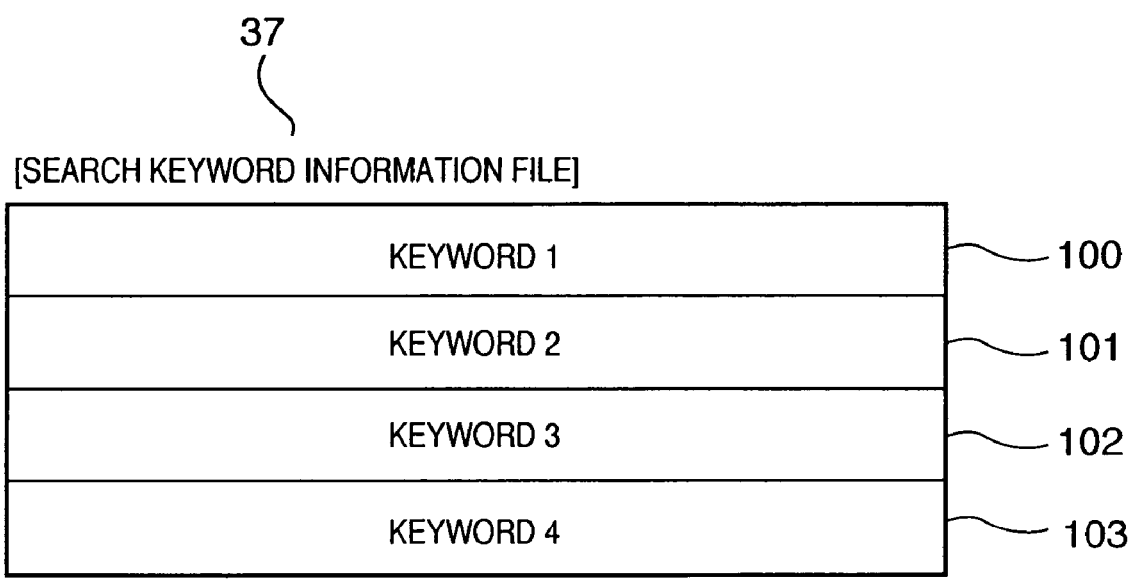
FIG. 10 shows an exemplary configuration of a search keyword information file.

FIG. 10 shows an exemplary configuration of a search keyword information file 37. Reference numerals 100 to 103 denote search keywords, which are used as keyword character strings for searching through a database when an electronic document file is recorded in the database. The search keywords are registered as search keys in the database. While four search keywords are shown in FIG. 10, more or less than four keywords may be registered. Alternatively, the number of keywords that can be stored may be set as a variable.

Figure 11:
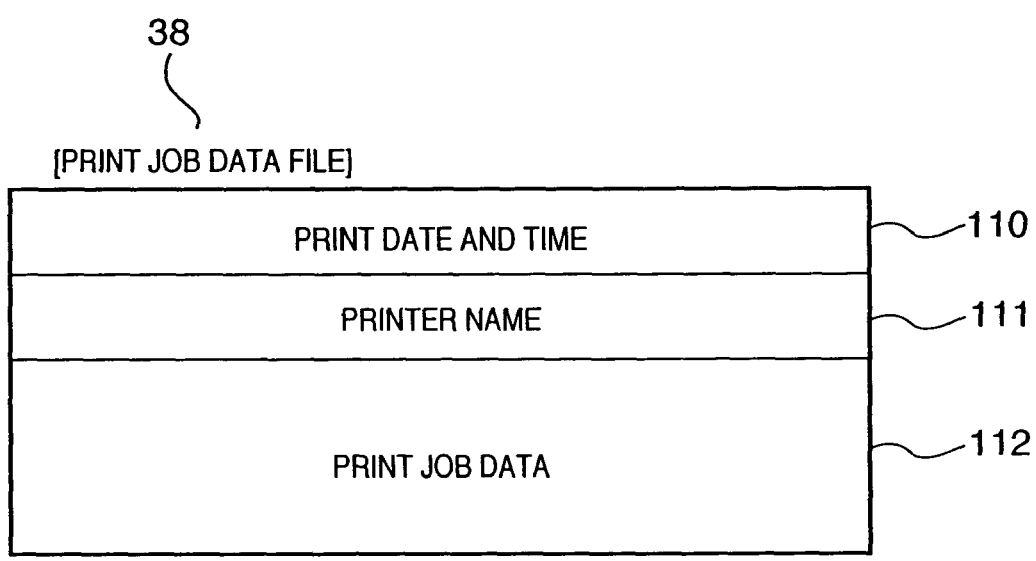
FIG. 11 shows an exemplary configuration of a print job data file.

FIG. 11 shows an exemplary configuration of a print job data file 38. Reference numeral 110 denotes the date and time at which the print job data was recorded. Field 111 contains a printer name which indicates the printer for which the print job data was created. Reference numeral 112 denotes the entire print job data generated by a printer driver when printing.

Figure 12:
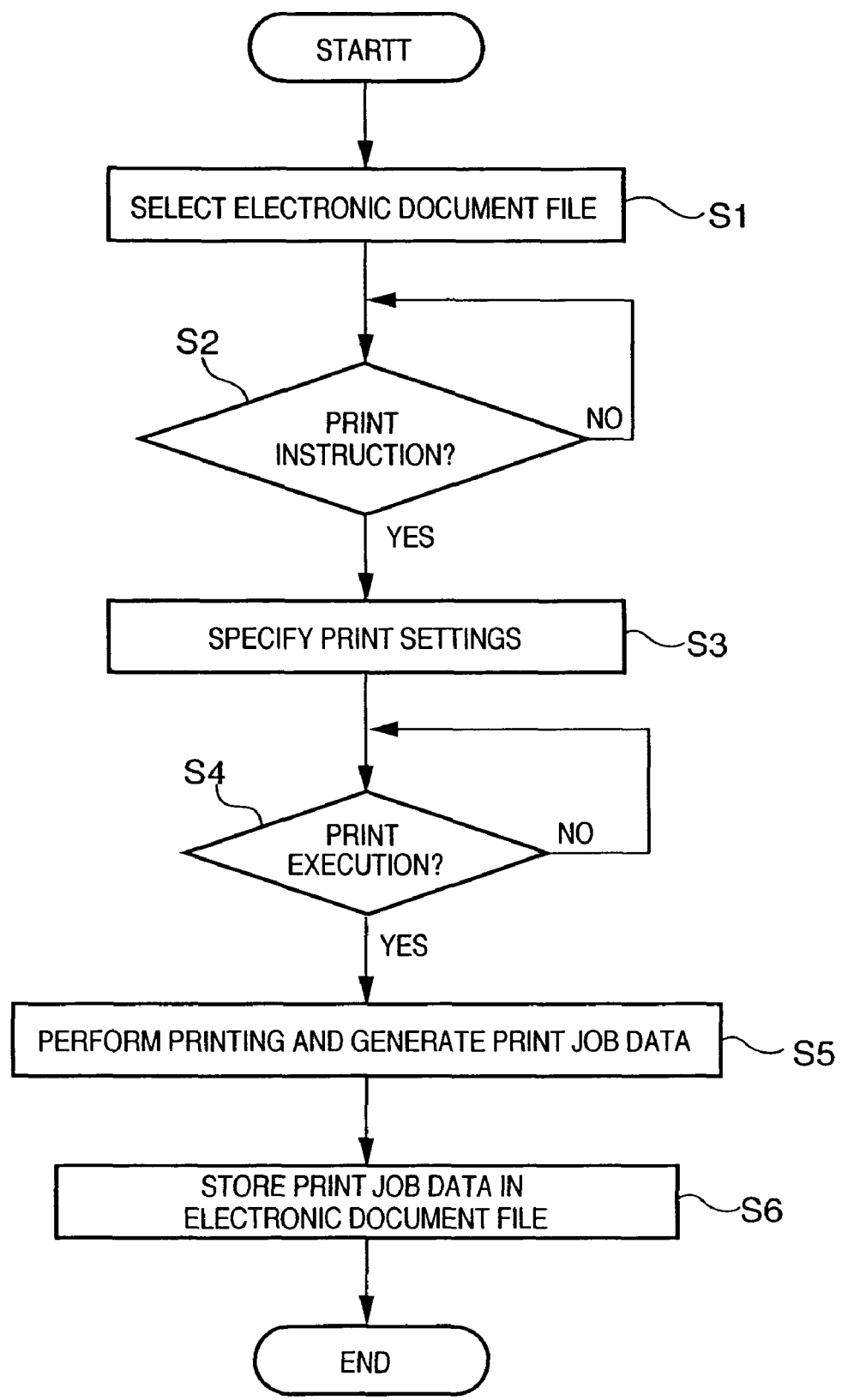
FIG. 12 is a flowchart illustrating a process follow for recording a print job data file in an electronic document file.

FIG. 12 is a flowchart illustrating a process flow for recording a print job data file in an electronic document file.

First, at step S1, an electronic document file is selected by using a keyboard 9 or PD 10. Then, at step S2, a CPU 2 determines whether or not an instruction to print the electronic document file selected at step S1 has been issued. If not (S2-NO), step S2 is repeated. If such an instruction has been issued (S2-YES), the process proceeds to step S3.

At step S3, a printer on which the file is to be printed is selected by using the keyboard 9 or PD 10 and the number of page to be printed, the number of copies, a scaling factor, and a print mode are set.

Then, at step S4, the CPU 2 determines whether or not an instruction to start printing has been issued. If not (S4-NO), step S4 is repeated; if such an instruction has been issued (S4-YES), the process proceeds to step S5.

At step S5, print job data is generated and printing is performed according to the settings made at step S3 and descriptions in a print procedure description file 31. In doing so, a copy of the print job data generated by a printer drover is generated. The print job data copied at step S5 is stored in the electronic document file as a print job data file 38 at step S6. Saving this file means that print data consisting of data such as a PDL is already generated when the electronic document file is printed and therefore the print data can be sent to a printer or a print server quickly compared with a case where print data is generated from application data.

(Import of Document File)

It is assumed here that files to be imported (import file) include a print file (in a format such as the BMP format, TIFF format, or PDF format (PDF is a registered trademark of ADOBE Systems Incorporated), an electronic document file (FIG. 3), and a document file which is not limited to the configuration shown in FIG. 3. Import of a document file will be described below in detail with respect to an example in which the import file is print file 2 (150) (see FIG. 15).

Figure 13:
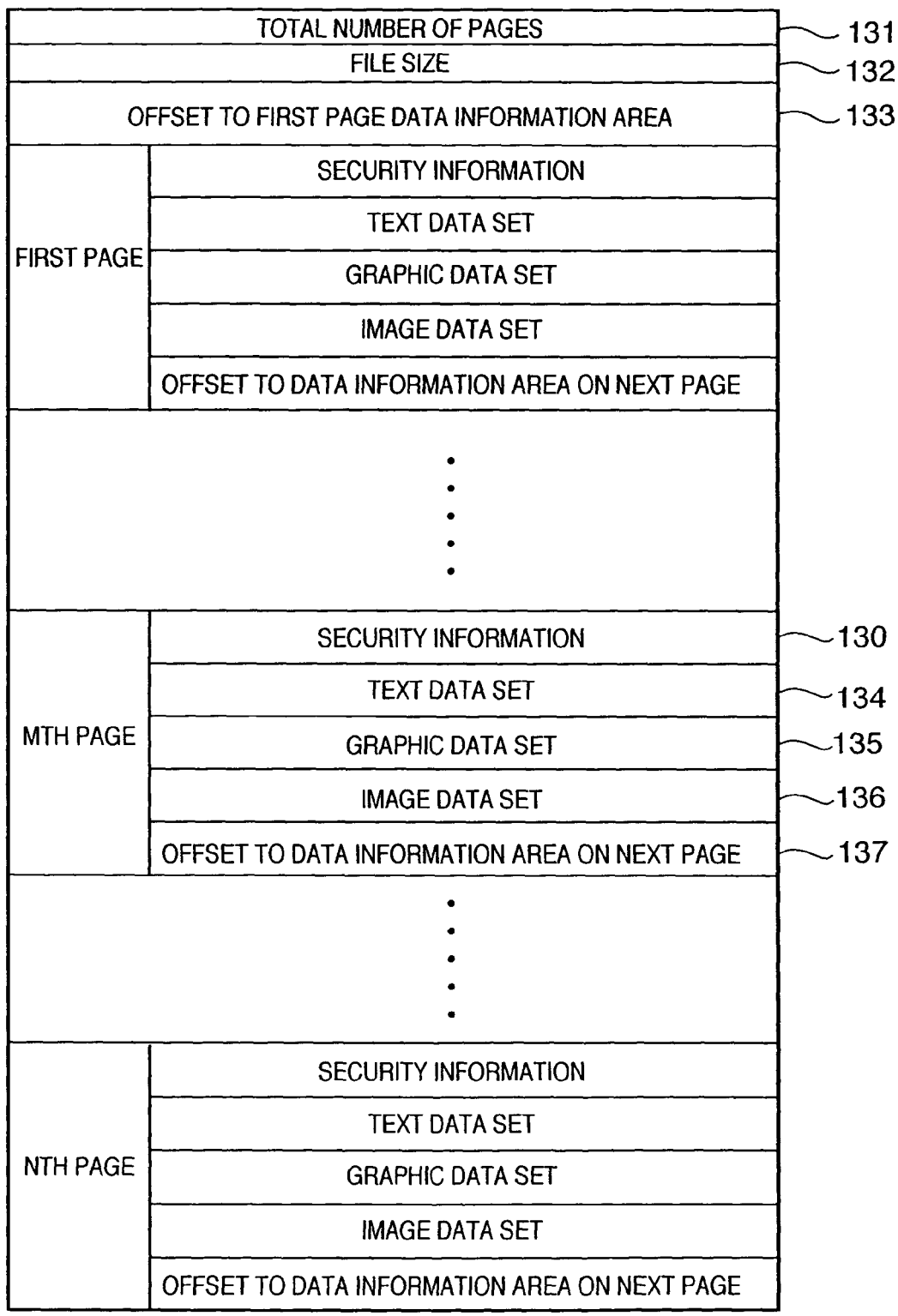
FIG. 13 shows an exemplary configuration of an electronic document file in which various types of security information such as edit preventing security information, print preventing security information, and copy preventing security information are set.

FIG. 13 shows an exemplary configuration of a document file such as a print file for which security information such as edit prohibition security information, print prohibition security information or copy prohibition security information.

The term "edit prohibition" is described first. The term edit prohibition refers to prohibition of operations such as modifications or additions to, or changes of layout of text or graphics in a document file such as a print file and reordering of pages in a document.

The term print prohibition refers to prohibition of printing of a document file such as a print file or prohibiting print out in high resolutions and permitting print out in a low resolution (for example 72 dpi).

The copy prohibition refers to prohibition of copying any page in a document file such as a print file or text or graphics in any page of a document file. Copy prohibition security information may be included in edit prohibition security information.

It will be understood that embodiments of the present invention are not limited to the security information described above.

It is assumed in the present embodiment that security information is recorded in a document file such as a print file and is not applied to files in the electronic document file 141 (FIG. 15) other than the print file 2 (150), for example. It is also assumed that the security information can be set page by page of a document file such as a print file.

Reference numeral 150 denotes the entire print file 2, reference numeral 131 denotes the total number of pages constituting the print file 2 (150), reference numeral 132 denotes the size of the print file 2 (150), and reference numeral 133 denotes an offset indicting a content information area constituting the first page of the print file 2 (150).

Reference numerals 130, 134, 135, 136, and 137 denote content information constituting the Mth page of the print file 2 (150) and reference numeral 130 denotes security information that is set for the Mth page. Various types of security information such as edit prohibition, print prohibition, or copy prohibition can be assigned to the Mth page on the basis of information set in the security information 130. Reference numeral 134 denotes an information field containing text data constituting the Mth page and reference numeral 135 denotes an information area containing graphic data constituting the Mth page, and reference numeral 136 denotes an information field containing image data constituting the Mth page. Reference numeral 137 denotes an offset indicating a content information area constituting the next page.

Figure 14:
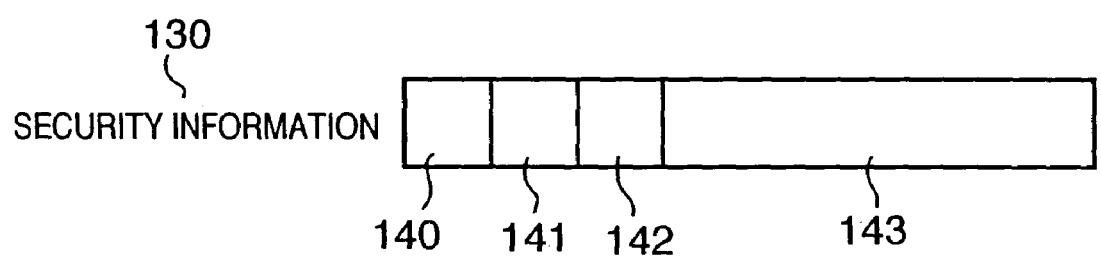
FIG. 14 is a diagram illustrating a configuration of security information associated with a print file.

FIG. 14 is a diagram illustrating a structure of security information 130. Reference numeral 140 denotes a FLAG filed for edit prohibition security information. If the FLAG is in the ON state, it indicates that edit prohibition security information is set. It is assumed in the present embodiment that the ON/OFF states of the FLAG are indicated by the ON/OFF states of a bit. Reference numeral 141 denotes a FLAG field for print prohibition security information, reference numeral 142 denotes a FLAG field for copy prohibition security information, and reference numeral 143 denotes a filed for recording other security information. In the present embodiment, the field 143 is reserved as a Reserve field. The CPU 2 can search for security information 130 for a print file to determine whether security information is added to the print file.

Figure 15:
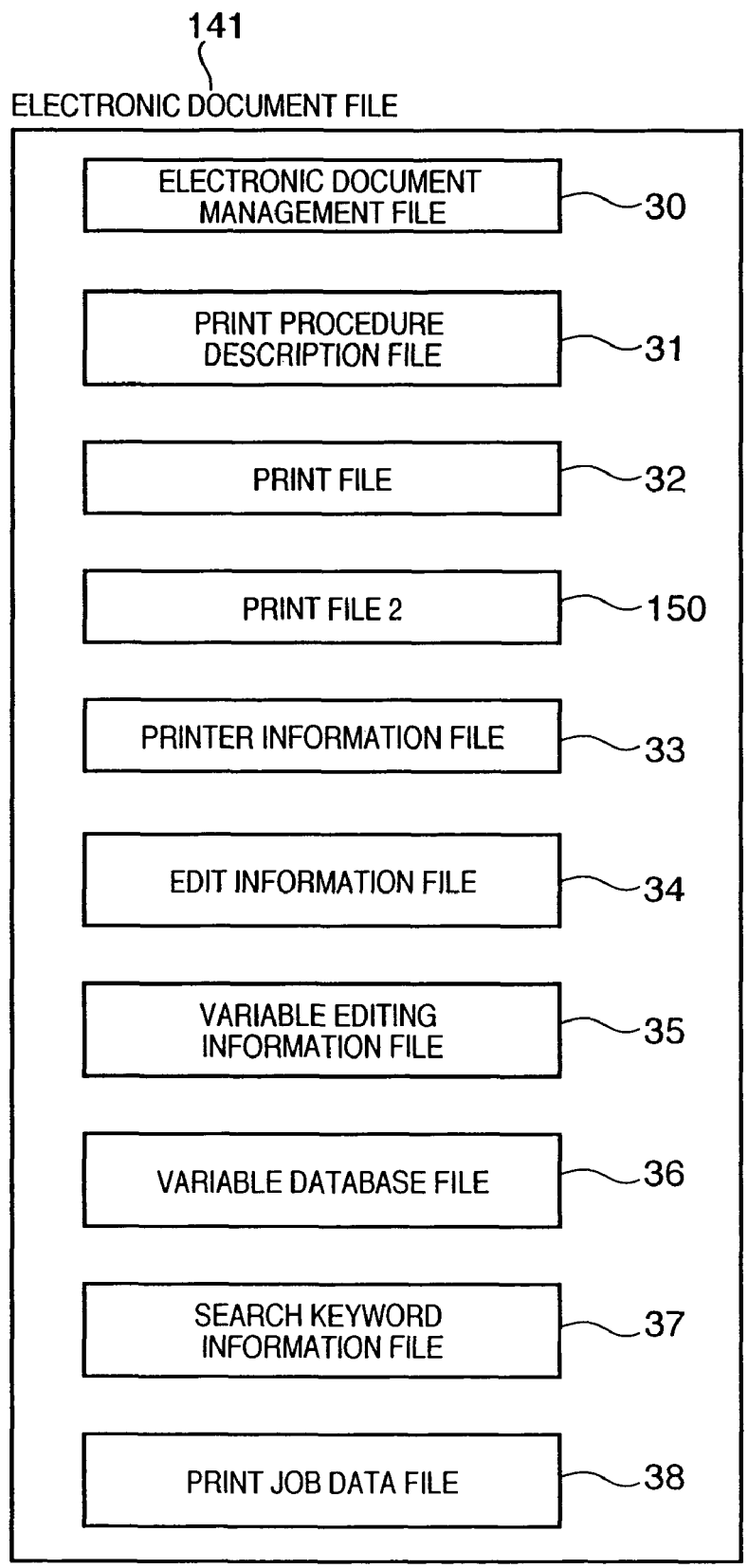
FIG. 15 is a diagram illustrating an electronic document file having two print files.

FIG. 15 shows how a print file 2 (150) to which security information is added is held in an electronic document file 141 after it is imported into the electronic document file. If security information is added to an imported print file 2 (150), the CPU 2 holds (records) the files (print file 32 and print file 2 (150)) as separate files in the electronic document file 141 while maintaining security information for each of the files, rather than merging the print file 32 before the import with the print file 2 (150) imported to generate one print file.

While an electronic document file is shown as the import-to document file (into which the print file is imported) in FIG. 15, import-to document files include image files in the BMP format, TIFF format, or PDF format (PDF is a registered trademark of Adobe Systems Incorporated) and document files which are not limited to the file structure shown in FIG. 15. The present embodiment can be applied to those files.

Figure 16:
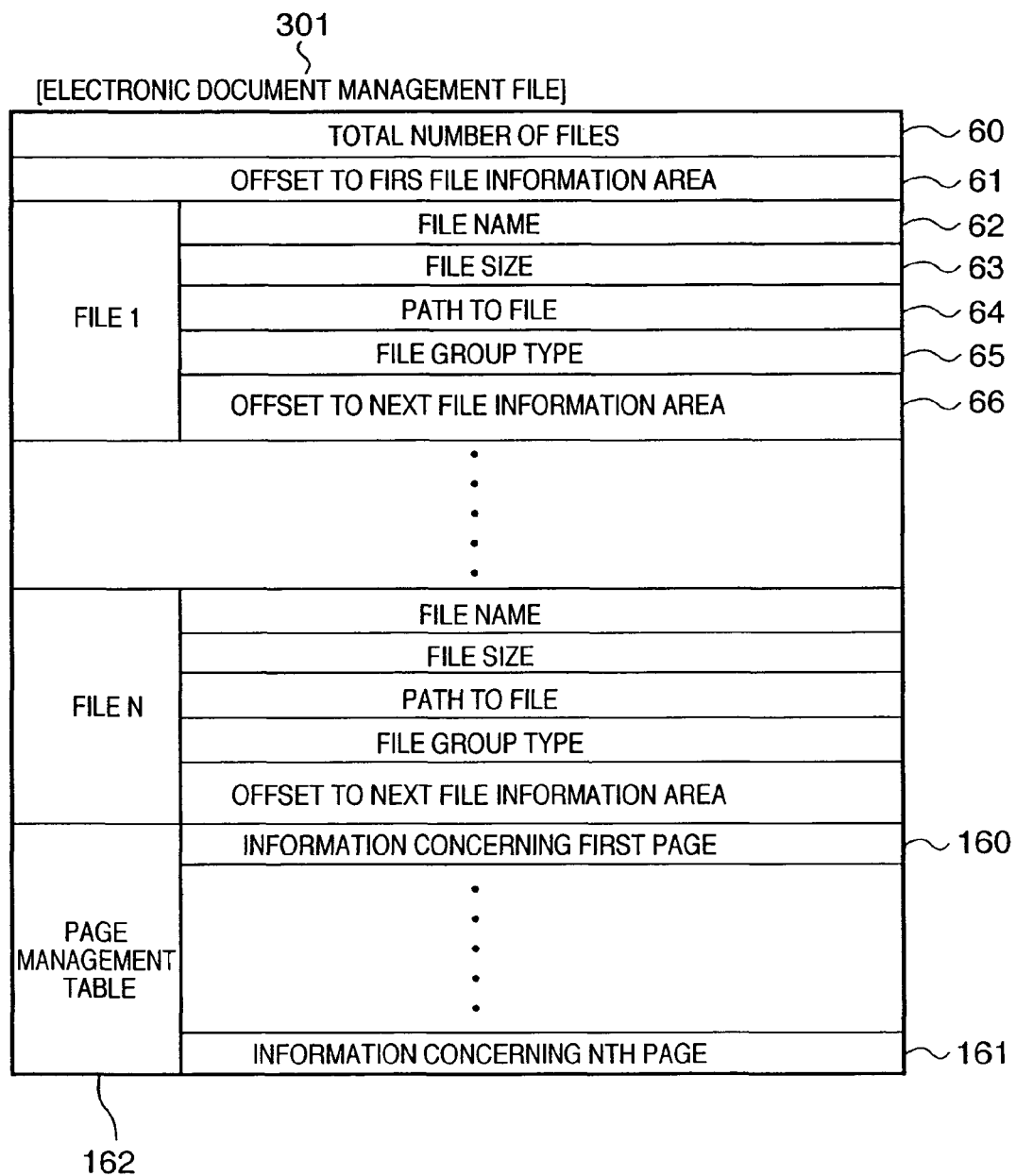
FIG. 16 is a diagram for explaining how page information is managed when more than one print file is recorded in an electronic document file.

FIG. 16 is a diagram for illustrating management of page information after a print file 2 (150) to which security information is applied is recorded in an electronic document file 141 as shown in FIG. 15. The CPU 2 generates an electronic document management file 301 to which a management table 162 describing information about each page and the file is added. The management table can be construed as a table for describing information about each level.

The management table 162 contains information for identifying the relationship between each page and the file. For example, information indicating which page number of which print file corresponds to the first page of the electronic document file can be recorded in field 160 and information indicating which page number of which print file corresponds to the Nth page of the electronic document file can be recorded in field 161. In this way, correspondences between all print files (32 and 150) recorded in the electronic document file 141 and the electronic document file 141 can be established.

FIG. 17A schematically illustrates a structure of the management table 162. In FIG. 17A, column 166 contains the identification of each of the files recorded in the electronic document file 141. Column 167 contains the numbers of the pages constituting each file. A file with file number 1 (contained in print file 32) consists of six pages. Print file 2 (150) consists of three pages.

Column 165 contains the page numbers of the electronic document file 141. Each page is associated with the print file 32, the print file 2 (150) and the corresponding page of the print file 2 (150). Column 168 contains flags indicating whether security information is attached to the pages of each file. The flags in column 168 correspond to security information 130 described with respect to FIG. 14. Any information may be set in column 168 that reflects security information. Column 170 contains a hierarchy of the chapter numbers of the electronic document file 141, which are associated with sections of the files recorded in the electronic document file. This allows each page of print file 32 and print file 2 (150) recorded in the electronic document file 141 to be edited or printed chapter by chapter of the electronic document file 141.

For a file, such as print file 2 (150), to which security information is applied, security settings such as edit prohibition or copy prohibition can be made within a hierarchy level of a chapter, that is, within an imported print file. The CPU 2 can identify the association between the chapters and the pages contained in the chapters in a hierarchical manner.

Figure 18:
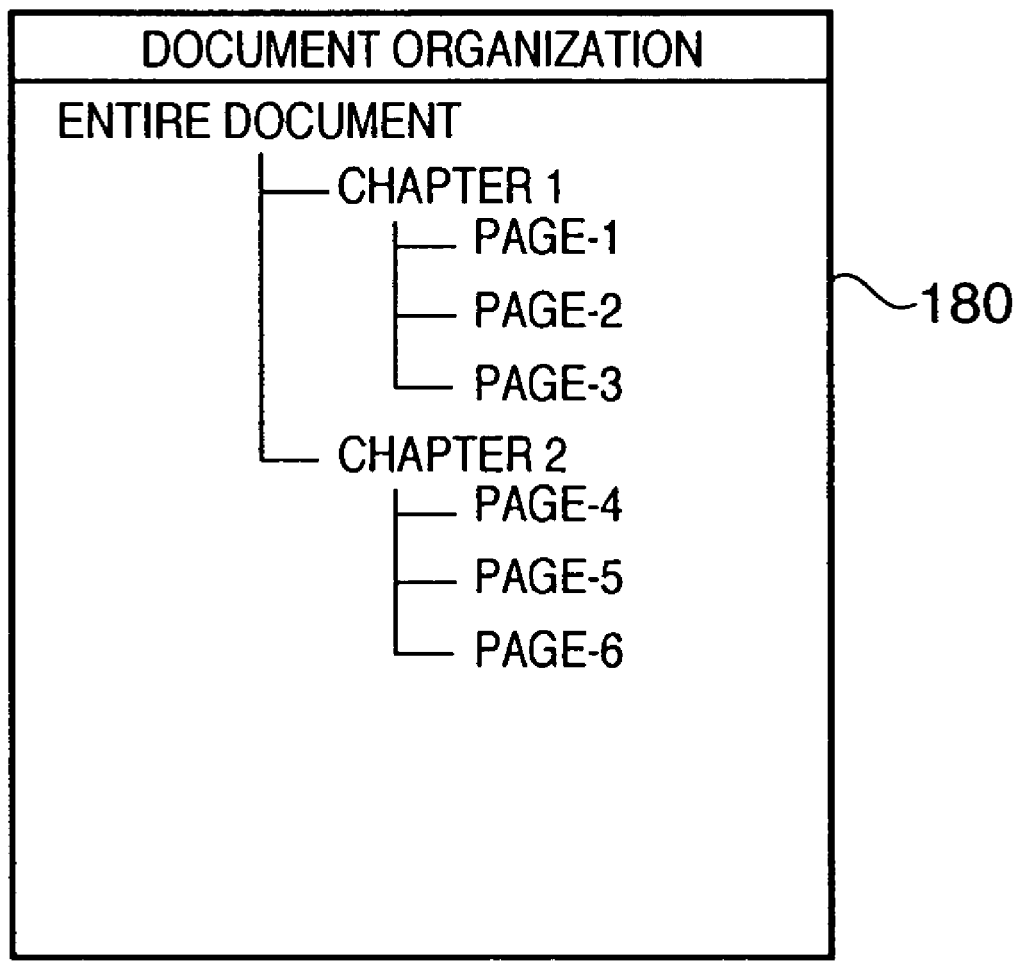
FIG. 18 shows a configuration of an electronic document file before a document file in which security information is set is imported.

FIG. 18 shows a structure of the electronic document file before the print file 2 (150) to which security information is applied is imported (which corresponds to the electronic document file 41 in FIG. 3). The display output controller 12 displays the structure of the electronic document file 41 on the display 13 according to the structure. In the exemplary display shown in FIG. 18, the entire print file 32 contained in the electronic document file 41 (FIG. 3) is represented as the entire document. The display represents that print file 32 consists of two chapters, each of which consists of three pages of data (180). In practice, the display output controller 12 presents the display in FIG. 18 according to a management table (not shown) contained in the electronic document management file shown in FIG. 5. The management table contained in FIG. 5 can be construed as the management table shown in FIG. 17A excluding chapter 2.

Figure 19:
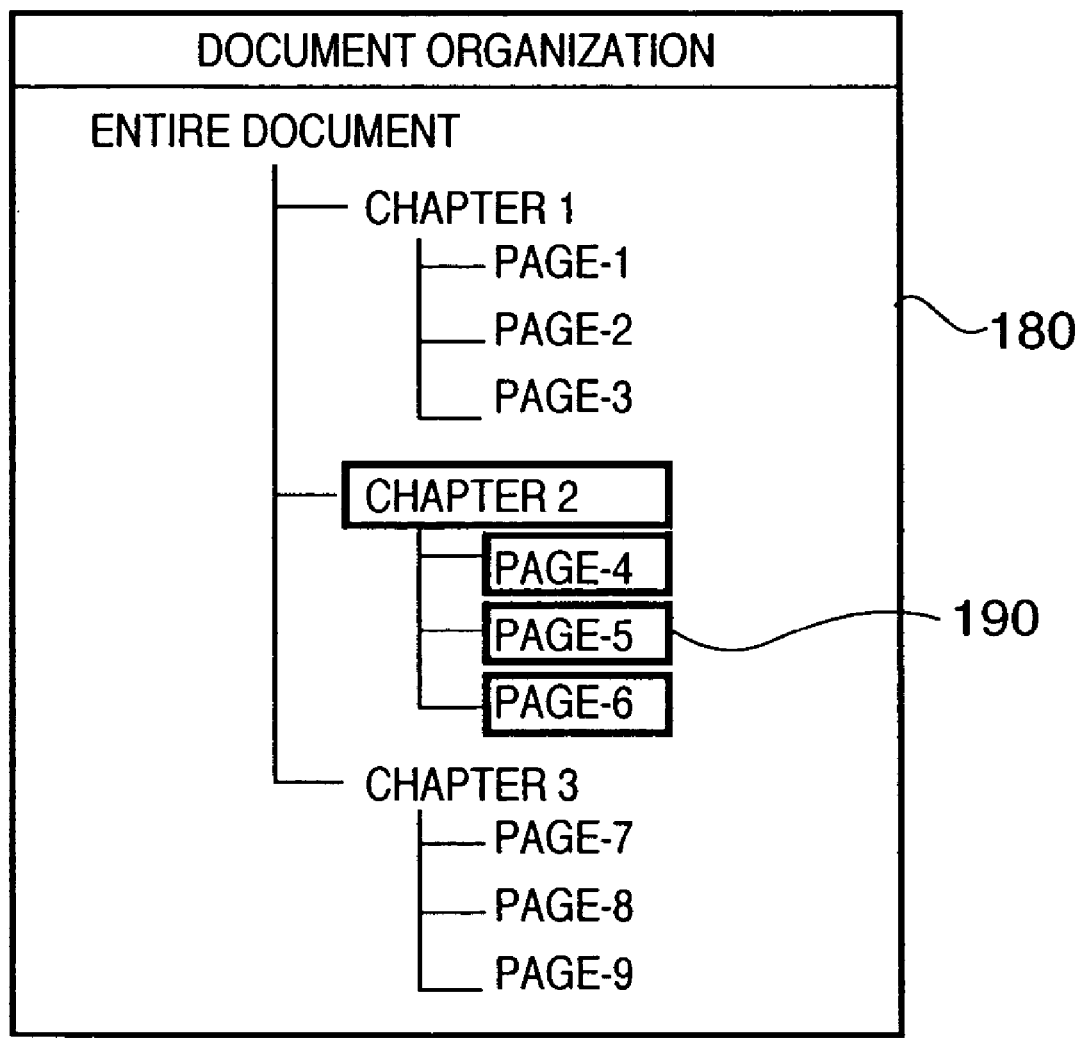
FIG. 19 shows a configuration of an electronic document file in which a document file in which security information is set is imported into a position between chapters 1 and 2 of the electronic document file shown in FIG. 18.

FIG. 19 shows a structure of the electronic document file 141 in which a print file 2 (150) for which security information (some security information such as edit prohibition or copy prohibition) is set is imported between chapters 1 and 2 of the print file 32 shown in FIG. 18. In this case, the display output controller 12 can display on the display 13 the relations between the pages and chapters of print file 32 and print file 2 (150) recorded in the electronic document file 141 (FIGS. 15, 17A and 17B). The display output controller 12 can presents the display on the display 13 in such a manner that a user can identify the portions indicating the chapters and the pages contained in the chapters to readily identify that the portion 190 corresponding to Chapter 2 is an imported portion and is a chapter (file) for which security information is set (boxes are drawn around Chapter 2 and the page numbers in the example shown in FIG. 19).

The CPU 2 may refer to the security information column in the management table shown in FIG. 17A and cause the pages for which at least one flag is in the ON state (=1) to be displayed as the portion 190. Of course, the table that can be referred to by the CPU 2 is not limited to the one shown in FIG. 17A. For example, security information may be provide on a file-by-file basis, rather than on a page-by-page basis, as shown in FIG. 17B and the CPU 2 may refer to the table in FIG. 17B and cause the file for which at least one flag is in the ON state to be display as the portion 190.

Figure 20:
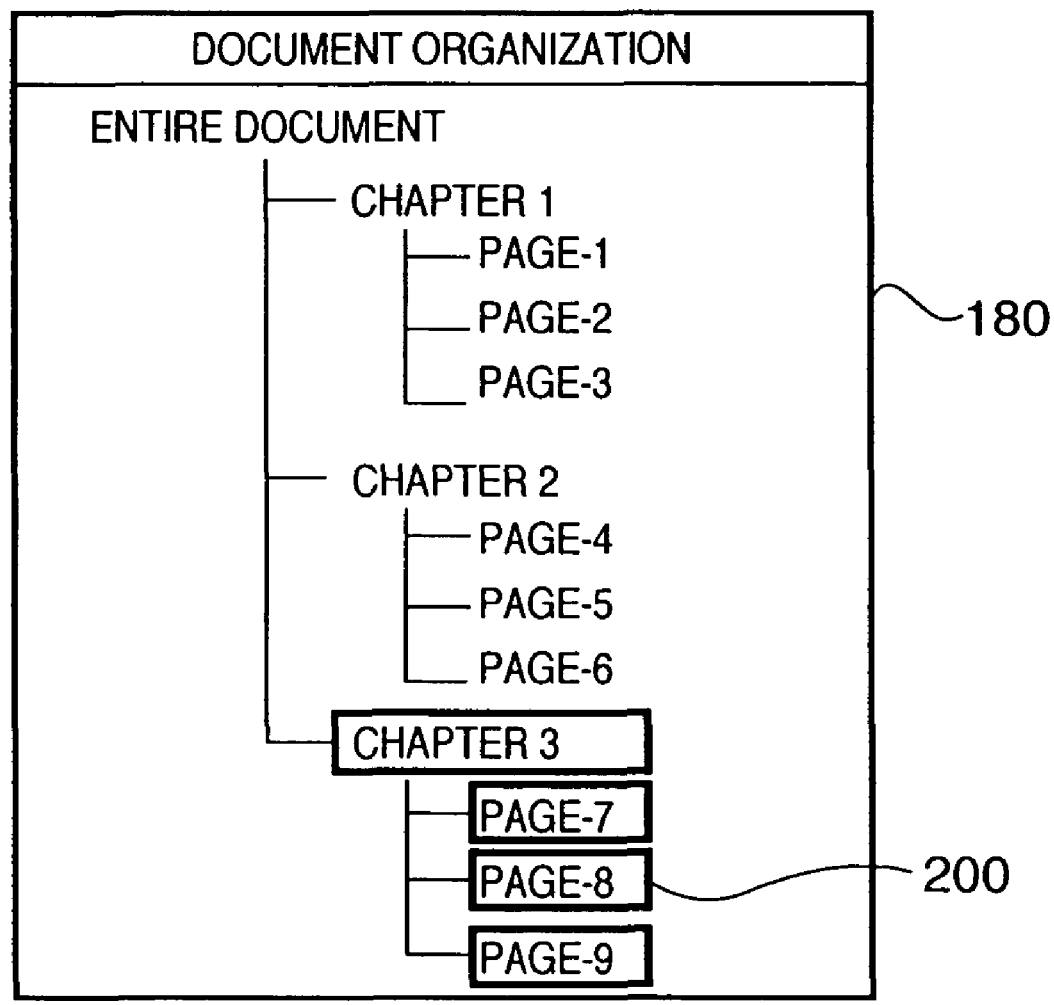
FIG. 20 shows an example in which chapter 2 imported and added to the electronic document file shown in FIG. 19 is changed to chapter 3.

FIG. 20 shows an example in which the chapters of the electronic document file 141 are changed so that the portion 190 imported and added to the electronic document file 141 and presented as Chapter 2 in FIG. 19 is presented as Chapter 3 (200). In this case, the CPU 2 can generate an electronic document file 301 the entire organization of which can be managed while maintaining security information in the document even if changes are made to the organization of the chapters. The CPU 2 changes the chapter number "2" to "3" and chapter number "3" to "2" in the chapter column (170) in the management table 162 (FIGS. 17A and 17B).

In FIG. 20, while Chapter 3 (200) is provided with security information, the other components (Chapters 1 and 2) of the document are not affected by the security information and therefore edits and printing of graphics and text in any pages or reordering and copying of any pages of in those components not prohibited. The CPU 2 can associate pages in the electronic document file 141 with print file 32 while maintaining security information for imported print file 2 (150), according to the management table 162 in the electronic document management file 301.

Figure 21:
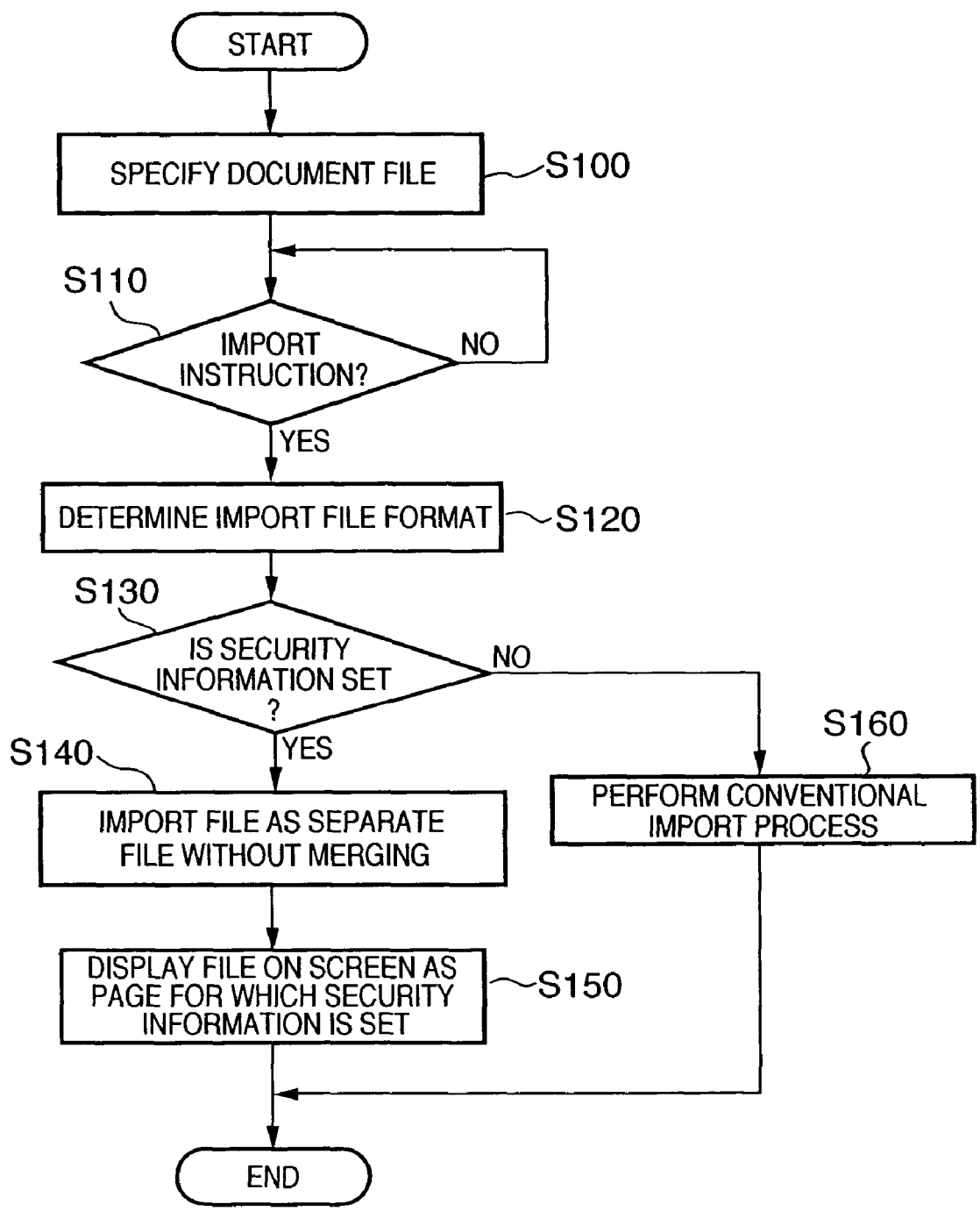
FIG. 21 is a flowchart specifically illustrating a process for importing a document file.

FIG. 21 is a flowchart illustrating a process flow for importing a document file for which certain security information such as edit prohibition is set. It is assumed in the present embodiment that the organization of a document based on the structure of an electronic document file 141 is visualized under the control of the display output controller 12 and a user can edit the electronic document by operating an input device such as a keyboard 9 and mouse 10 while looking at the display screen (as shown in FIG. 18, for example).

At step S100, a document file such as print file to be imported and a document file such as an electronic document file into which the file is to be imported are specified through user operations on an input device such as a keyboard 9 or a PD 10. Then, at step S110, the CPU 2 of the electronic document processing apparatus 23 determines whether an instruction to start import is inputted through the keyboard 9 or the PD 10. If not (S110-NO), the CPU 2 repeats step S110 while waiting for an import start instruction.

On the other hand, if an import instruction is inputted at step S110 (S110-YES), then the process proceeds to step S120. At step S120, the CPU 2 determines the file format that is set in the import document file specified at step S100. In the present embodiment, the CPU 2 checks an extension of a print file 2 (150). If an API (Application Programming Interface) for determining security information (130) for the file is provided as in the case of a PDF file (PDF is a registered trademark of Adobe Systems Incorporated), the CPU 2 uses the API to determine whether certain security information such as edit prohibition security information is set or not. If no API is provided for the file, the CPU 2 determines from a file property (contained in the electronic document file for indicating whether security information is set or not) whether certain security information such as edit prohibition is set or not. If the format of the file is open to the public, the electronic document processing apparatus 23 itself performs a process for obtaining security information on the basis of the format information, which will not be described in the present embodiment.

If the CPU 2 determines at step S130 that security information such as edit prohibition is not set (S130-NO), then the process proceeds to step S160, where a conventional process for importing the document file is performed (for example, the two files are merged into a print file). Description of the conventional import process will be omitted in the present embodiment.

On the other hand, if the CPU 2 determines at step S130 that security information such as edit prohibition is added to the import document file (S130-YES), the process proceeds to step S140, where the CPU 2 places the document file for which edit prohibition security information is set into the import-to electronic document file and holds (records) as a separate file without merging it in the electronic document file. FIG. 15 shows the state of the electronic document file 141 in which the print file 2 (150) is held as a separate file for which security information such as edit prohibition is set.

Then, the process proceeds to step S150, where the display output controller 12 displays the print file 2 (150) on the display 13 according to the structure of the import-to electronic document file 141 (FIGS. 15, 17A, and 17B) so that a user can identify it as pages for which security information such as edit prohibition is set (see FIG. 19).

The usability of the electronic document file for the user can be further improved by displaying restrictions along with the electronic document file that indicate what kinds of operations on the imported print file 2 (150) can be permitted or prohibited, at any timing through the display output controller 12, in response to the import of the print file 2 (150) with security information into the electronic document file through step S140. Furthermore, the usability can be further improved by displaying different appropriate restrictions according to the type of security information attached to the imported print file.

The restrictions may be displayed in conjunction with the display at step S150 in FIG. 21 or when the mouse cursor is placed on an indicator (for example "Chapter 3" 190 in FIG. 19) indicating that security information is set.

The description of the restrictions displayed may be that edits to the print file cannot be made to the imported print file, if edit prohibition security information is attached to the print file, or that the pages of the imported print file can be moved within the electronic document file only in the entirety of the print file.

Also, the description of the restriction displayed may be that the electronic document file containing the print file can be printed but the pages corresponding to the print file is printed in a low resolution (for example 72 dpi), if print prohibition security information is attached to the imported print file, that the pages corresponding to the print file are labeled with a given mark such as the name of the author of the file.

In this way, according to the present embodiment, an electronic document file can be created while maintaining security information added to a print file, rather than simply prohibiting the print file with the security information from being imported. Further, because the pages of the print file with security information are permitted to be replaced in the entirety of the file within the electronic document file as shown in FIGS. 19 and 20, an electronic document file edit environment with a certain minimum degree-of-freedom for a user can be provided.

Figure 22:
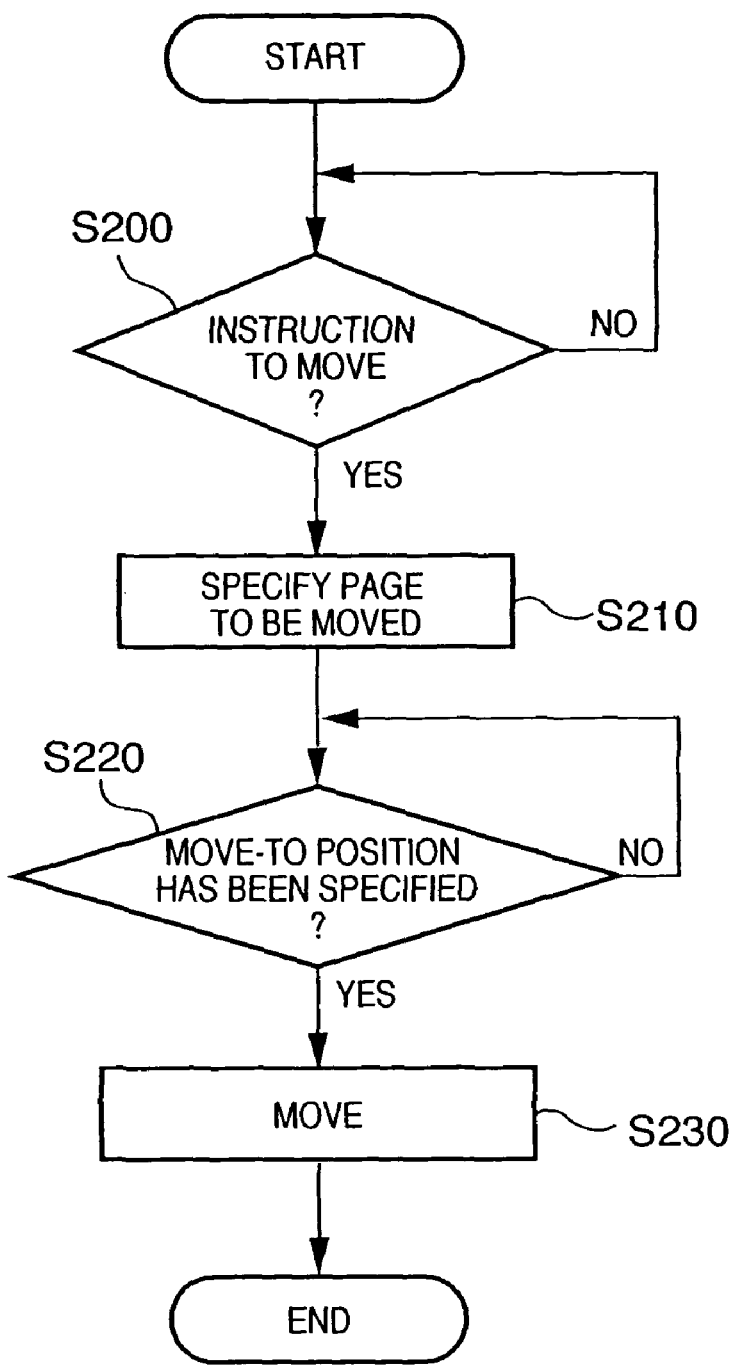
FIG. 22 is a flowchart specifically illustrating a process for importing a document file.

FIG. 22 is a flowchart of a process flow for moving the pages (changes of the page numbers or chapter number of a print file 2 (150)) for which edit prohibition security information is set.

The initial state of the process is one in which a print file 2 (150) has been imported in an electronic file as shown in FIG. 19.

First at step S200, the CPU 2 determines whether or not a move start instruction is issued through a keyboard 9 or a PD 10. If not (S200-NO), then the CPU 2 repeats step S200 while waiting for an input.

On the other hand, at step S200, if an instruction to move is issued (S200-YES), the process proceeds to step S210, where pages (pages 4-6 in the example in FIG. 19) to be moved is specified through the use of the keyboard 9 or PD 10. At step S220, the CPU 2 determines whether a position to which the pages should be moved has been specified or not. The pages to be moved can be specified by operating a pointer that moves with the PD 10 to indicate the pages and depressing an operation button of the PD 10, which is not shown, on the document organization dialog 180 shown in FIG. 19. Similarly, the position to which the pages are to be moved can be specified by operating the pointer that moves with the PD 10.

In the present embodiment, if an instruction is provided that specifies page 4 as the page to be moved in the document organization dialog 180 shown in FIG. 19 and instructs to move the page 4 to the position immediately subsequent to page 9 (S200-YES), the process proceeds to step S230, where the CPU 2 moves the page according to the information specified (S230). The result of the movement is shown in FIG. 20. Because edit prohibition security information is set for the page (page 4) specified to be moved at step S210, the entire print file 2 (150) for which the edit prohibition security information is set is moved.

Figure 24:
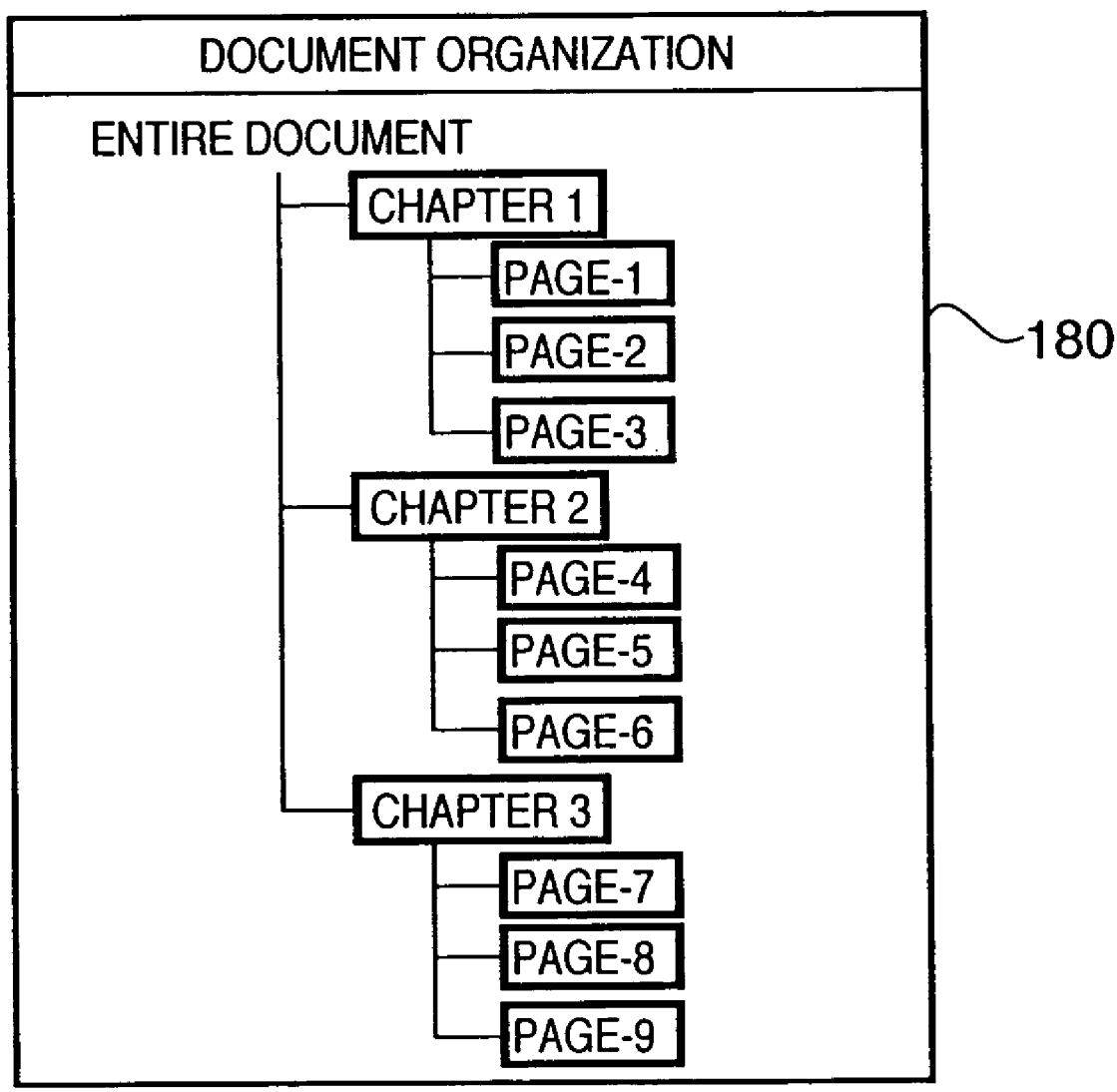
FIG. 24 shows a configuration of an electronic document file displayed on a display as a document configuration dialog by a display output controller if the entire electronic document file becomes uneditable because of edit preventing information set in security information.
Figure 25:
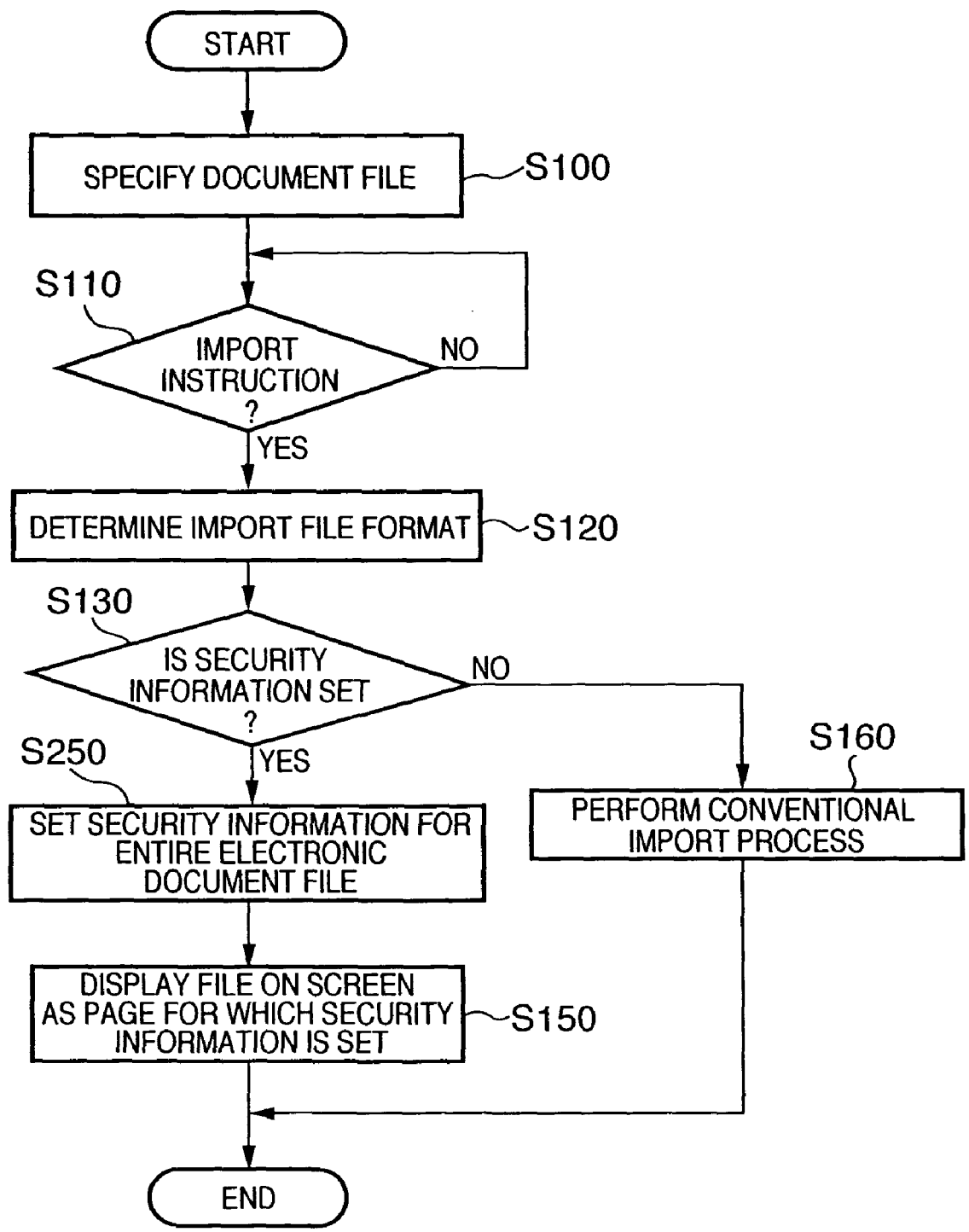
FIG. 25 is a flowchart illustrating the process flow illustrated in FIGS. 23 and 24 in detail.

Referring to FIGS. 23 to 25, an embodiment will be described below in which when an electronic document file for which security information is set is imported in an electronic document file, the security information of the print file 2 (150) affects the entire electronic document file. This embodiment is useful in applications where security information for a print file 2 (150) can be applied to an entire electronic document file so that the management of the electronic document file can be facilitated.

FIG. 23 shows a configuration of an electronic document fail header information 401 in which security information 230 generated by a CPU 2 is recorded. Adding the security information 230 for an imported print file 2 (150) to the electronic document file 141 enables the security information to affect the entire electronic document file 141. FLAG areas for edit prohibition security information, print prohibition security information, and copy prohibition security information may be provided as described earlier and shown in FIG. 14, for example, and the CPU 2 may determine whether the bit in the any of the FLAG field is in the ON or OFF state to determine whether security information is set or not. The CPU 2 can turn ON or OFF a bit to change security information for the electronic document file 141.

FIG. 24 shows a structure of an electronic document file displayed by the display output controller 12 as a document organization dialog 180 on the display 13 if edit prohibition security is set as the security information 230 in the electronic document file header information 401 in FIG. 23 and the entire electronic document file is prohibited from being edited. The edit prohibition security information affects the entire electronic document file and the display output controller 12 draws a box around the entire organization of the electronic document file (Chapters 1 to 3) on the display 13.

FIG. 25 is a flowchart illustrating in detail the process flow described with reference to FIGS. 23 and 24. Steps S100 to S130 and steps S150 and S160 are the same as those in the flowchart in FIG. 21 and therefore the description of which will be omitted here.

If the CPU 2 determines at step S130 that an imported document file such as a print file is provided with certain security information such as edit prohibition (S130-YES), the process proceeds to step S250, where the CPU 2 writes the security information (the edit prohibition security information in this example) set for the imported document file (for example the print file 2 (150)) in the security information field 230 in the electronic document file header information 401 to update the electronic document file header information 401. The display output controller 12 displays on the display 13 an indication that updated edit prohibition security information is set for the entire electronic document file 141 into which the print file 2 was imported (see FIG. 24).

Figure 26:
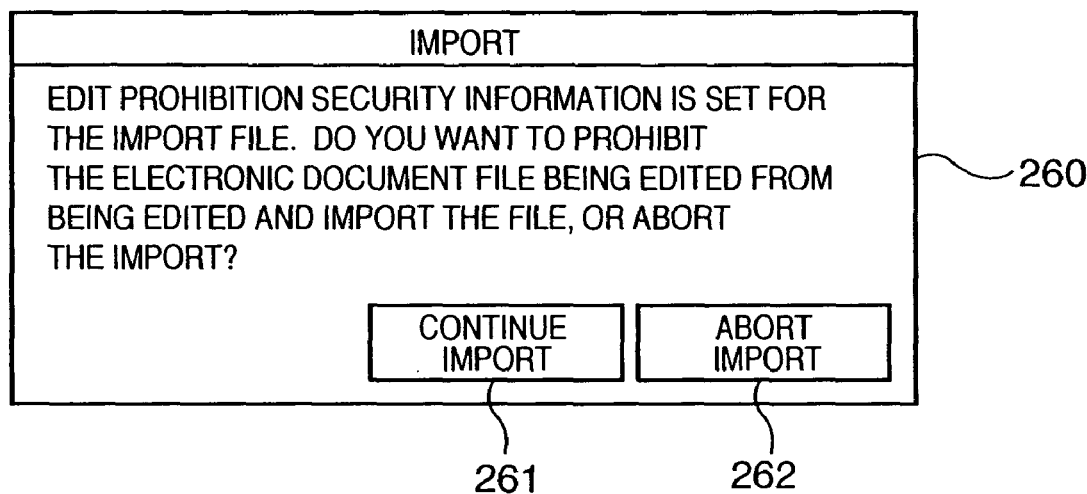
FIG. 26 shows an example of a dialog panel that allows a user to choose whether to apply a security information setting to an entire document file into which a print file for which security information is set is to be imported.

FIG. 26 shows a dialog panel 260 for allowing a user to chose whether to apply security information to an entire electronic document file 141 when importing a document file (for example a print file 2 (150)) for which the security information is set in to the electronic documents file 141. The dialog panel 260 is displayed on the display 13 under the control of the display output controller 12. Reference numeral 261 indicates a button to instruct to perform the import. In the present embodiment, the instruction can be confirmed by positioning a pointer that moves with the PD 10 on the button 261 and depressing a button on the PD 10. Reference numeral 262 indicates a button for instructing not to import the file; the operation of the button 262 is the same as that of the button 261.

Figure 27:
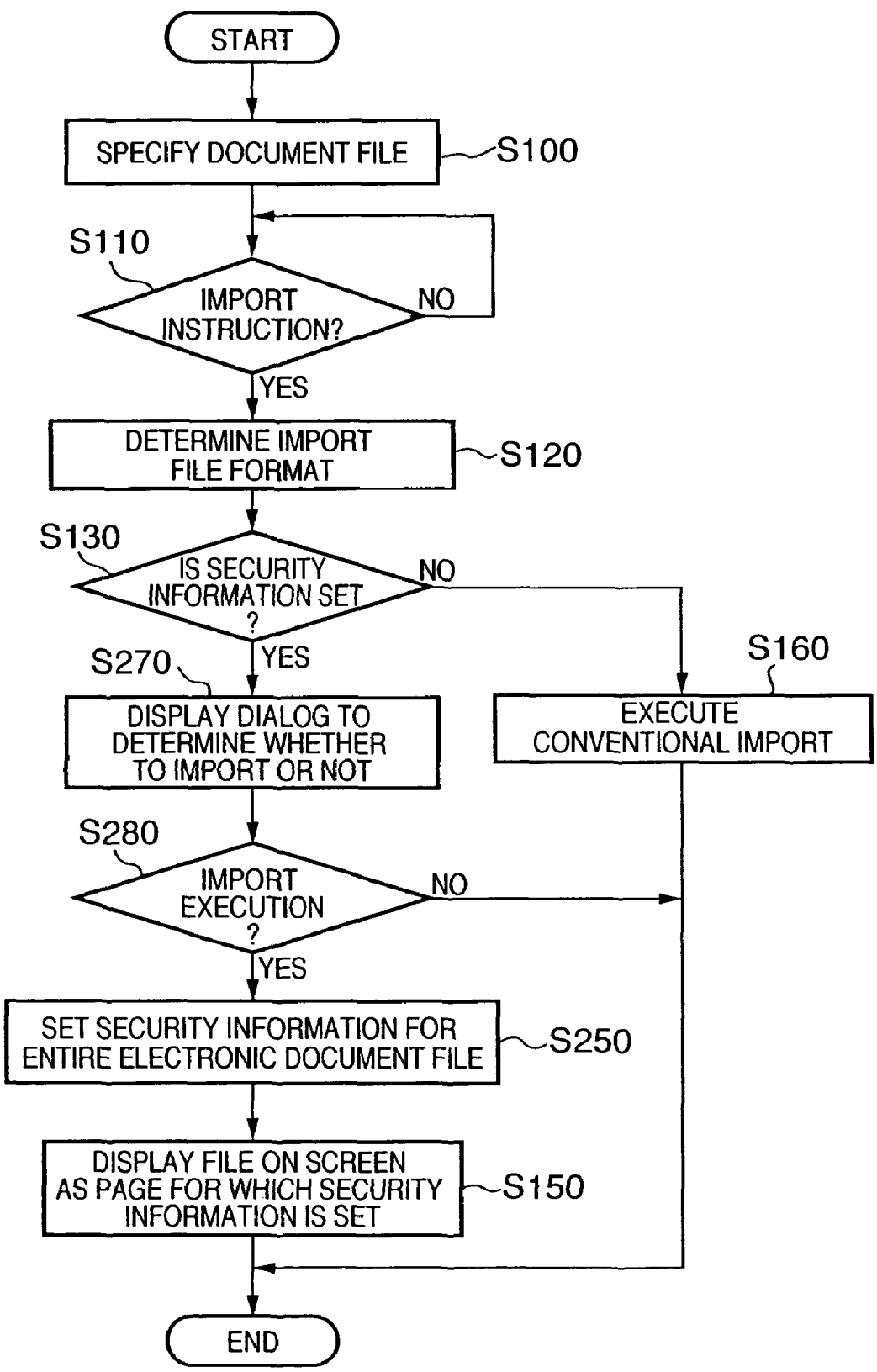
FIG. 27 is a flowchart illustrating a process flow for performing an importing process according to the choice in the dialog panel shown in FIG. 26.

FIG. 27 is a flowchart illustrating a process flow for performing an import according to the selection on the dialog panel 260 in FIG., 26. Steps S100 to S130, S150, S160 and S250 in the flowchart in FIG. 27 are the same as those in FIG. 25 and therefore the description of which will be omitted here.

If the CPU 2 determines at step S130 that security setting is set for the imported document file such as the print file (S130-YES), the process proceeds to step S270, where the display output controller 12 displays on the display 13 the dialog box 260 (FIG. 26) to allow the user to chose whether to apply the security information to the entire electronic document file 141 into which the file is imported. Then the process proceeds to step S280, where the CPU 2 determines whether an instruction to continue the importing has been inputted or not. If an instruction to continue the importing is issued (S280-YES), the process proceeds to step S250. The operations at step 250 and the subsequent steps are the same as those in FIG. 25. On the other hand, if an instruction abort the importing is issued (S280-NO), the process ends without performing the import.

While the present embodiment has been described with respect to a case where edit prohibition security information is set, the spirit of the present invention is not limited to such security information. The present invention can equally applied to cases where other security information such as print prohibition or copy prohibition, or a combination thereof is used.

Also, while the present embodiment has been described with respect to a case where predetermined security information is set to the print source file 2 (150) of the import source on a page-by-page basis, cases where security information is set for the entire file as a unit or on a content-by-content basis can be treated in the same way described above, that is, as if security information were set for all imported pages.

As has been described, according to the present embodiment, an electronic document file for which security information is set can be imported into an electronic document file to be edited, with the security information being maintained. Thus, the present embodiment facilitates management and editing of the electronic document file.

Furthermore, the CPU 2 in the electronic document processing apparatus allows such additional information as a watermark stored in an edit information file 34 to be added to pages corresponding to a file for which security information is set during editing the imported document file (for example the print file 2 (150)). The image input/output controller 6 can control printing in which such additional information is added to a print file 2 (150).

When a document file (for example a print file 2 (150)) including a security information is exported from an electronic document file 141, the CPU 2 refers to a management table 162 containing information that identifies the association of each page with a file to determine which pages correspond to the specified document to be exported and exports the identified print file from the electronic document file 141. If additional information such as a watermark is added to the print file 2 (150) to be exported, the CPU 2 can exclude the additional information added in editing and export the print file 2 (150).

According to the present invention, a document file for which security information is set can be into a document file to be edited, with the security information being contained in the document file.

Thus, security information such as edit prohibition, print prohibition, or copy prohibition set for the import document file can affects the document file into which it is imported.

Furthermore, the present invention can be applied to a system including a number of devices (for example a host computer, interface devices, readers, and printers) as well as an apparatus formed by a single device (such as a copying machine, a printer, or a facsimile machine). Moreover, the object of the present invention can also be achieved by a computer (or a CPU or an MPU) of a system or an apparatus reading and executing software program codes stored on a storage medium that implement the functions of the embodiments described above. In that case, the program codes read from the storage medium implement the functions of the embodiments described above and the storage medium on which the program codes are stored constitutes the present invention.

The storage medium for supplying the program codes may be a flexible disk, hard disk, optical disk, magneto-optical disk, CD-ROM, CD-R, magnetic tape, non-volatile memory card, ROM, or the like.

As mentioned above, the functions of the embodiments can be implemented by a computer reading and executing the program codes. In addition, the function of the embodiments described above may be implemented by an OS (Operating System) running on the computer and performing part or all of the actual processing. Such an implementation is also falls within the scope of the present invention.

Moreover, the present invention includes an implementation in which the program codes read from the recording medium is written in a memory in a function expansion board inserted into a computer or a function expansion unit connected to a computer, and then a CPU or the like provided in the function expansion board or unit performs part or all of the actual processing, which implements the functions of the embodiments described above.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-177339 filed on Jun. 15, 2004, which is hereby incorporated by reference herein.

What is claimed is:

1. A document processing apparatus for importing a specified first document file into a second document file to be edited, comprising:
   a determination unit adapted to determine whether or not security information is added to the first document file;
   an import controller that imports the first document file with the security information into the second document file in order to generate a third document file, if the determination unit determines that the security information is added to the first document file;
   a receiving unit adapted to receive an instruction for editing the third document file in a unit of a page included in the third document file;
   an edition controller that, if edit prohibition security information is added to the first document file, permits editing the third document file by movement of all pages which are imported from the first document file into the third document file, and prohibits editing the third document file by editing of each page among the pages imported from the first document file;
   an adding unit adapted to add additional information to a page based on the first document file;
   a control unit adapted to cause printing based on the additional information added by the adding unit; and
   an export control unit adapted to export the first document file including the security information from the third document file, wherein the export control unit exports the first document file excluding the additional information,
   wherein a processor is configured to function as said edition controller, and
   wherein said edition controller relocates pages of the third document file without changing the location of pages in the first document file.

2. The document processing method according to claim 1, further
   comprising a restriction message displaying step of displaying a message for restricting an
   operation on the third document file generated as a result of importing of the first document file to which security information is added.

3. The document processing method according to claim 2, wherein the restriction message displaying step displays a message indicating restriction of an operation on the third document file in accordance with the type of security information added to the first document file.

4. A document processing method for importing a first specified document file into a second document file to be edited, comprising:

a determination step of determining whether or not security information is added to the first document file;

an import control step of importing the first document file with the security information into the second document file in order to generate a third document file, if the determination step determines that the security information is added to the first document file;

a receiving step of receiving an instruction for editing the third document file in a unit of a page included in the third document file;

an edition control step of, if edit prohibition security information is added to the first document file, permitting editing of the third document file by movement of all pages which are imported from the first document file into the third document file, and prohibiting editing the third document file by editing of each page among the pages imported from the first document file;

an adding step of adding additional information to a page based on the first document file;

a control step of causing printing based on the additional information added by the adding step; and an export control step of exporting the first document file including the security information from the third document file, wherein the export control step exports the first document file excluding the additional information, wherein the edition control relocates pages of the third document without changing the location of pages in the first document file.

5. The document processing method according to claim 4, further comprising a warning control step of issuing a warning, depending on a change made in the edition control step.

6. The document processing method according to claim 4, wherein if a document file to which the determination step determines the security information is not added is imported into the second document file, the edition control step changes the order of any of the pages in the third document file.

7. The document processing method according to claim 4, further comprising a generating step of generating a management table for identifying the second document file and the first document file.

8. The document processing method according to claim 7, wherein the import control step causes the first document file to which the security information is added to be held in the third document file as a separate file including the security information, in accordance with the management table.

9. The document processing method according to claim 7, wherein the generating step generates the management table as data for identifying the association between the chapters and pages of the first document file in the third document file.

10. The document processing method according to claim 7, further comprising a display output control step for highlighting the first document file to indicate that security information is added to the first document file, on the basis of the management table.

11. The document processing method according to claim 7, wherein the import control step changes data stored in the management table in accordance with an inputted instruction to perform editing of the first document file held in the third document file while keeping the security information being contained in the first document file.

12. The document processing method according to claim 4, further comprising a step of generating header information which enables security information set in the first document file to affect the entire third document file.

13. A document processing program which is embodied on a computer-readable storage medium and causes a computer to perform a document processing method for importing a specified first document file into a second document file to be edited, said document processing method comprising:

a determination step of determining whether or not security information is added to the first document file;

an import control step of importing the first document file with the security information into the second document file in order to generate a third document file, if the determination step determines that the security information is added to the first document file;

a receiving step of receiving an instruction for editing the third document file in a unit of a page included in the third document file;

an edition control step of, if edit prohibition security information is added to the first document file, permitting editing of the third document file by movement of all pages which are imported from the first document file into the third document file, and prohibiting editing the third document file by editing of each page among the pages imported from the first document file;

an adding step of adding additional information to a page based on the first document file;

a control step of causing printing based on the additional information added by the adding step; and an export control step of exporting the first document file including the security information from the third document file, wherein the export control step exports the first document file excluding the additional information, wherein the edition control relocates pages of the third document without changing the location of pages in the first document file.

* * * * *